United States Patent
Dhanda et al.

(10) Patent No.: US 12,015,845 B2
(45) Date of Patent: Jun. 18, 2024

(54) OBJECT DEPTH ESTIMATION AND CAMERA FOCUSING TECHNIQUES FOR MULTIPLE-CAMERA SYSTEMS

(71) Applicant: Apple Inc., Cupertino, CA (US)

(72) Inventors: Abhishek Dhanda, San Ramon, CA (US); Gregory Guyomarc'h, San Francisco, CA (US); Mark N. Gamadia, Campbell, CA (US)

(73) Assignee: Apple Inc., Cupertino, CA (US)

(*) Notice: Subject to any disclaimer, the term of this patent is extended or adjusted under 35 U.S.C. 154(b) by 144 days.

(21) Appl. No.: 17/479,584

(22) Filed: Sep. 20, 2021

(65) Prior Publication Data
US 2023/0081349 A1 Mar. 16, 2023

Related U.S. Application Data

(60) Provisional application No. 63/243,611, filed on Sep. 13, 2021.

(51) Int. Cl.
| | |
|---|---|
| *H04N 23/67* | (2023.01) |
| *G02B 7/28* | (2021.01) |
| *G03B 13/36* | (2021.01) |
| *H04N 23/51* | (2023.01) |
| *H04N 23/959* | (2023.01) |

(52) U.S. Cl.
CPC ............ *H04N 23/675* (2023.01); *G02B 7/285* (2013.01); *G03B 13/36* (2013.01); *H04N 23/51* (2023.01); *H04N 23/959* (2023.01)

(58) Field of Classification Search
CPC .... H04N 23/675; H04N 23/51; H04N 23/959; H04N 23/662; H04N 23/67; H04N 23/90; G02B 7/285; G02B 5/287; G02B 7/40; G03B 13/36
See application file for complete search history.

(56) References Cited

U.S. PATENT DOCUMENTS

| | | |
|---|---|---|
| 8,098,287 B2 | 1/2012 | Misawa et al. |
| 9,848,137 B2 | 12/2017 | Hizi et al. |
| 10,542,247 B2 | 1/2020 | Chang et al. |

(Continued)

FOREIGN PATENT DOCUMENTS

| | | | | |
|---|---|---|---|---|
| CN | 112601008 A | * | 4/2021 | ......... H04N 5/23212 |
| KR | 1020202123433 | | 6/2020 | |

OTHER PUBLICATIONS

U.S. Appl. No. 17/479,426, filed Sep. 20, 2021, Dhanda.

(Continued)

*Primary Examiner* — Abdelaaziz Tissire
(74) *Attorney, Agent, or Firm* — Brownstein Hyatt Farber Schreck, LLP

(57) ABSTRACT

Various embodiments disclosed herein include techniques for operating a multiple camera system. In some embodiments, a primary camera may be selected from a plurality of cameras using object distance estimates, distance error information, and minimum object distances for some or all of the plurality of cameras. In other embodiments, a camera may be configured to use defocus information to obtain an object distance estimate to a target object closer than a minimum object distance of the camera. This object distance estimate may be used to assist in focusing another camera of the multi-camera system.

20 Claims, 8 Drawing Sheets

(56) References Cited

U.S. PATENT DOCUMENTS

| | | | |
|---|---|---|---|
| 10,701,256 B2 | 6/2020 | Zhou et al. | |
| 11,252,337 B1 | 2/2022 | Yang et al. | |
| 11,350,026 B1* | 5/2022 | Manzari | H04N 23/80 |
| 11,575,821 B2 | 2/2023 | Kim et al. | |
| 11,750,922 B2* | 9/2023 | Dhanda | H04N 23/958 |
| | | | 348/222.1 |
| 2012/0154593 A1 | 6/2012 | Anderson | |
| 2013/0063614 A1* | 3/2013 | Tsutsumi | H04N 23/68 |
| | | | 348/208.4 |
| 2013/0322862 A1* | 12/2013 | Hsu | G03B 13/36 |
| | | | 396/125 |
| 2016/0295097 A1* | 10/2016 | Shanmugavadivelu | |
| | | | H04N 23/45 |
| 2017/0359494 A1* | 12/2017 | Zhou | H04N 23/60 |
| 2019/0215438 A1* | 7/2019 | Lee | H04N 17/002 |
| 2020/0026030 A1* | 1/2020 | Baer | H04N 23/90 |
| 2021/0076080 A1* | 3/2021 | Yoo | H04N 21/4854 |
| 2021/0195096 A1 | 6/2021 | Keskikangas et al. | |
| 2022/0321808 A1 | 10/2022 | Dwarakanath et al. | |
| 2023/0156301 A1* | 5/2023 | Feng | H04N 23/45 |
| | | | 348/262 |

OTHER PUBLICATIONS

U.S. Appl. No. 17/483,513, filed Sep. 23, 2021, Dwarakanath et al.
Greiffenhagen et al., "Statistical Modeling and Performance Characterization of a Real-Time Dual Camera Surveillance System,".
Xie et al., "Design and Implementation of a Dual-Camera Wireless Sensor Network for Object Retrieval,".

\* cited by examiner

OBJECT DEPTH ESTIMATION AND CAMERA FOCUSING TECHNIQUES FOR MULTIPLE-CAMERA SYSTEMS

CROSS-REFERENCE TO RELATED APPLICATION

This application claims the benefit under 35 U.S.C. § 119(e) of U.S. Provisional Patent Application No. 63/243,611, filed Sep. 13, 2021, the contents of which are incorporated herein by reference in its entirety.

FIELD

The described embodiments relate generally to estimating one or more distances to a target object using a multi-camera system and selecting a primary camera for and/or focusing a camera of the multi-camera system using the same.

BACKGROUND

Cameras continue to be an important feature of consumer electronics devices such as smartphones, tablets, and computers. While these consumer electronics devices traditionally had either a single camera or two cameras facing in opposite directions, many devices now have multiple camera systems with two or more cameras having at least partially overlapping fields of view. The different cameras in these multiple camera systems may be advantageously utilized in different scenarios and having multiple fields of view may allow for the overall device to provide for different levels of optical zoom without requiring a camera with a large and complicated zoom lens. With multiple cameras that may selectively be used across different image modes, it may be difficult to make sure the proper camera or cameras are being used (and used effectively) in different instances.

SUMMARY

The present disclosure relates to multi-camera systems. In some variations, embodiments include multi-camera systems and associated methods of selecting a primary camera from a multi-camera system. Specifically, some embodiments include a method for selecting between a first camera and a second camera of a multi-camera system as a primary camera during image capture of a target object, the first camera having a first minimum object distance and a second camera having a second minimum object distance. These methods may comprise determining a first object distance estimate for the target object using the first camera, wherein the first object distance estimate is associated with a first distance error information, determining a second object distance estimate for the target object using the second camera, wherein the second object distance is associated with a second distance error information, and selecting, using a camera selection logic, one of the first camera and the second camera as the primary camera using the first object distance estimate, the second object distance estimate, the first distance error information, the second distance error information, and the second minimum object distance.

In some of these variations, the multi-camera system may comprise a depth sensor and the method may further comprising determining a third object distance estimate for the target object using the depth sensor. In some of these embodiments, the method may further comprise holding a focus position of the second camera at a predetermined position when the third object distance estimate is below a first threshold distance. In other embodiments, selecting one of the first camera and the second camera as the primary camera comprises setting a first switching threshold distance using the first distance error information, the second distance error information, and the second minimum object distance. In some of these variations, selecting one of the first camera and the second camera as the primary camera comprises selecting the first camera as the primary camera when either the first object distance estimate or the second object distance estimate is less than the first switching threshold distance. In others of these variations, selecting one of the first camera and the second camera as the primary camera comprises setting a second switching threshold distance that is longer than the first switching threshold distance, and the method further comprises selecting the second camera as the primary camera when both the first object distance estimate and the second object distance estimates are greater than the second switching threshold distance. In some variations, the second minimum object distance is dynamically varied based on a calculated orientation of the second camera.

Other embodiments include a device comprising a multi-camera system, the multi-camera system comprising a first camera having a first minimum object distance and a first field of view and a second camera having a second minimum object distance and a second field of view, and a camera selection logic configured to select either the first camera or the second camera as a primary camera. The camera is further configured to receive a first object distance instance from the first camera and a first distance error information associated with the first object distance estimate, receive a second object distance instance from the second camera and a second distance error information associated with the second object distance estimate, receive the second minimum object distance, and select the primary camera using the first object distance estimate, the second object distance estimate, the first distance error information, the second distance error information, and the second minimum object distance.

In some of these variations, the first minimum object distance is shorter than the second minimum object distance, and a first field of view fully encompasses the second field of view. Additionally or alternatively, the multi-camera system further comprises a depth sensor configured to generate a third object distance estimate. In some of these variations, the multi-camera system is configured to hold a focus position of the second camera at a predetermined position when the third object distance estimate is below a first threshold distance. In other variations, selecting the primary camera comprises setting a first switching threshold distance using the first distance error information, the second distance error information, and the second minimum object distance. In some of these variations, selecting the primary camera comprises selecting the first camera as the primary camera when either the first object distance estimate or the second object distance estimate is less than the first switching threshold distance. In others of these variations, selecting the primary camera comprises setting a second switching threshold distance that is longer than the first switching threshold distance, and further comprises selecting the second camera as the primary camera when both the first object distance estimate and the second object distance estimates are greater than the second switching threshold distance.

In another embodiment, a method for selecting between a plurality of cameras of a multi-camera system as a primary camera during image capture of a target object, wherein each of the plurality of cameras has a respective minimum object distance may comprising determining at least one object distance estimate for the target object using at least one of the plurality of cameras, wherein each of the at least one object distance estimates is associated with a respective distance error information, and selecting, using a camera selection logic, the primary camera from the plurality of cameras. The select the primary camera, the camera logic may use the at least one object distance estimate, the respective distance error information associated with each of the at least one object distance estimates, and at least one of the respective minimum object distances of the plurality of cameras. In some examples the method may comprise updating a first minimum object distance of the at least one of the respective minimum object distances, and selecting the primary camera using the updated first minimum object distance. In other examples, the method may comprise updating a first distance error information of the respective distance effort information associated with each of the at least one object distance estimates, and selecting the primary camera using the updated first distance error information.

In some examples, the multi-camera system further comprises a depth sensor, and selecting the primary camera further comprises using the camera selection logic further comprises selecting the primary camera using a first object distance estimate from the depth sensor. In some of these variations, the method may further comprise holding a focus position of a first camera of the plurality of cameras at a predetermined position when the first object distance estimate is below a first threshold distance. In some instances, the method may comprise setting focus positions, using the camera selection logic, for one or more of the plurality of cameras (and in some embodiments, each of the plurality of cameras).

In some variations, embodiments include multi-camera systems and associated methods of focusing a camera of the multi camera system. In some embodiments, a device may comprise a multi-camera system that includes a first camera configured with autofocus capabilities and having a first minimum object distance, and a second camera configured with autofocus capabilities and having a second minimum object distance. The device further comprises a focus control logic configured to cause the second camera to measure defocus information for a target object at a predetermined focus position, determine an extrapolated focus position using the defocus information, and cause the first camera to focus on the target object based at least in part on the extrapolated focus position. In some variations, the predetermined focus position corresponds to the minimum object distance of the second camera. In other variations, the focus control logic causes the first camera to lock to the predetermined focus position when one or more predetermined locking criteria is met. In some of these variations, the multi-camera system further comprises a depth sensor, and wherein the one or more predetermined criteria comprises an object distance estimate for the target object being less than a threshold locking distance.

In some variations, the first minimum object distance is less than the second minimum object distance. The device may further comprise a camera selection logic configured to select either the first camera or the second camera as a primary camera, and wherein the focus control logic is further configured cause the second camera to measure defocus information for the target object at the predetermined focus position when first camera is selected as the primary camera. In other variations, causing the first camera to focus on the target object based at least in part on the extrapolated focus position comprises setting a target focus position for the first camera based on a predetermined relationship between the extrapolated focus position when confidence information associated with the extrapolated focus position meets a first predetermined criteria.

Other embodiments described here include a method for focusing a first camera of a multi-camera system using a second camera of the multi-camera system comprising measuring defocus information for a target object using the first camera at a predetermined focus position, determining an extrapolated focus position using the defocus information, and causing the first camera to focus on the target object based at least in part on the extrapolated focus position. In some examples, the predetermined focus position corresponds to a minimum object distance of the second camera. In other instances, the method may comprise locking the first camera to the predetermined focus position when one or more predetermined locking criteria is met. In some of these variations, the method may comprise calculating an object distance estimate for the target object using a depth sensor of the multi-camera system, and comparing the object distance estimate to a threshold locking distance, wherein the predetermined locking criteria is met when the object distance estimate is less than the threshold locking distance.

In some variations, measuring defocus information for the target object using the first camera at the predetermined focus position comprises measuring defocus information while the first camera is selected as a primary camera. In other variations, causing the first camera to focus on the target object based at least in part on the extrapolated focus position comprises setting a target focus position for the first camera based on a predetermined relationship between the extrapolated focus position when confidence information associated with the extrapolated focus position meets a first predetermined criteria. In some of these variations, causing the first camera to focus on the target object based at least in part on the extrapolated focus position comprises performing a partial scan based on the extrapolated focus position when confidence information associated with the extrapolated focus position does not meet a first predetermined criteria.

Other embodiments discussed here include methods of calculating an object distance estimate to a target object using a multi-camera system comprising a first camera and a second camera. The method may comprise determining whether the second camera is being maintained at a predetermined focus position, measuring, in response to determining that the second camera is being maintained at the predetermined focus position, defocus information for the target object while the second camera is maintained at the predetermined focus position and calculating the object distance estimate using the defocus information and the predetermined focus position. In some of these methods, determining whether the second camera is being maintained at a predetermined focus position comprises determining that the second camera is locked to the predetermined focus position. In other variations, the predetermined focus position is a macro focus position for the second camera, and determining whether the second camera is being maintained at a predetermined focus position comprises determining that the target object is closer than a minimum object distance of the second camera.

In some variations the methods may further comprise calculating an extrapolated focus position for the second camera using the object distance estimate. In some of these variations, the methods may comprise focusing the first camera based at least in part on the extrapolated focus position for the second camera. In some of these variations, focusing the first camera based at least in part on the extrapolated focus position comprises selecting a target focus position for the first camera based on a predefined relationship between focus positions of the second camera and focus positions of the first camera.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
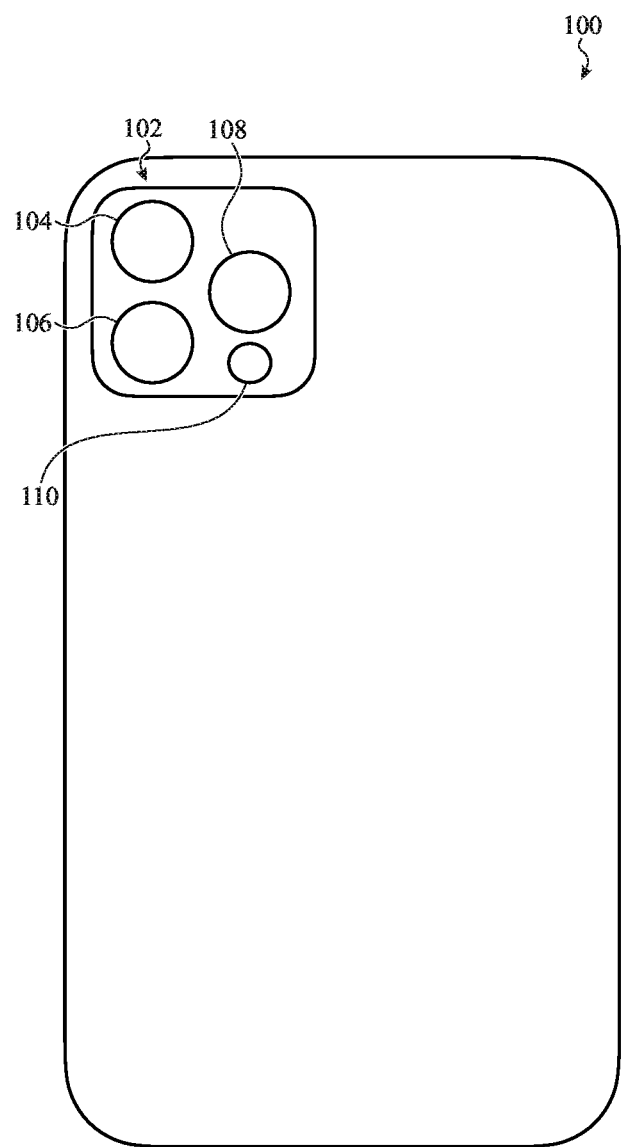
FIG. 1A shows a rear view of a device comprising a multi-camera system.

It should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

Directional terminology, such as "top", "bottom", "upper", "lower", "front", "back", "over", "under", "above", "below", "left", "right", "vertical", "horizontal", etc. is used with reference to the orientation of some of the components in some of the figures described below, and is not intended to be limiting. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to multiple camera ("multi-camera") systems and methods of operating these multi-camera systems. In some embodiments, the multi-camera systems may be configured to select a primary camera from a plurality of cameras of the multi-camera system, wherein the multi-camera system is configured to switch the primary between a first camera and a second camera as a primary camera at or near a minimum object distance of the second camera. In other embodiments, the multi-camera system may calculate an object distance estimate to a target object using a camera of the multi-camera system in situations where the target object is positioned closer than the minimum object distance for the camera. In some of these embodiments, this object distance estimate may be used to help set a focus position of a different camera of the multi-camera system. Preferably, the camera may use defocus information associated with the target object to calculate an extrapolated focus position, which may be used in focusing another camera on a target object. These and other embodiments are discussed below with reference to FIGS. 1A-6. However, those skilled in the art will readily appreciate that the detailed description given herein with respect to these Figures is for explanatory purposes only and should not be construed as limiting.

FIG. 1A shows a rear view of a device 100 comprising a multi-camera system 102 suitable for use with the various embodiments described here. In general, the multi-camera system 102 comprises a first camera 104 and a second camera 106. The multi-camera system 102 may optionally include one or more additional cameras (e.g., a third camera 108 as shown in FIG. 1A) and/or one or more depth sensors (e.g., depth sensor 110 as shown in FIG. 1A). For the purpose of this application, at least the first camera 104 and the second camera 106 are configured to have autofocus capabilities, as will be described in more detail below.

In some embodiments, the device 100 is a portable multifunction electronic device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer, which may have a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content by transmitting, via a wired or wireless connection, data (e.g., image data or video data) to an integrated or external display generation component to visually produce the content.

Figure 1B:
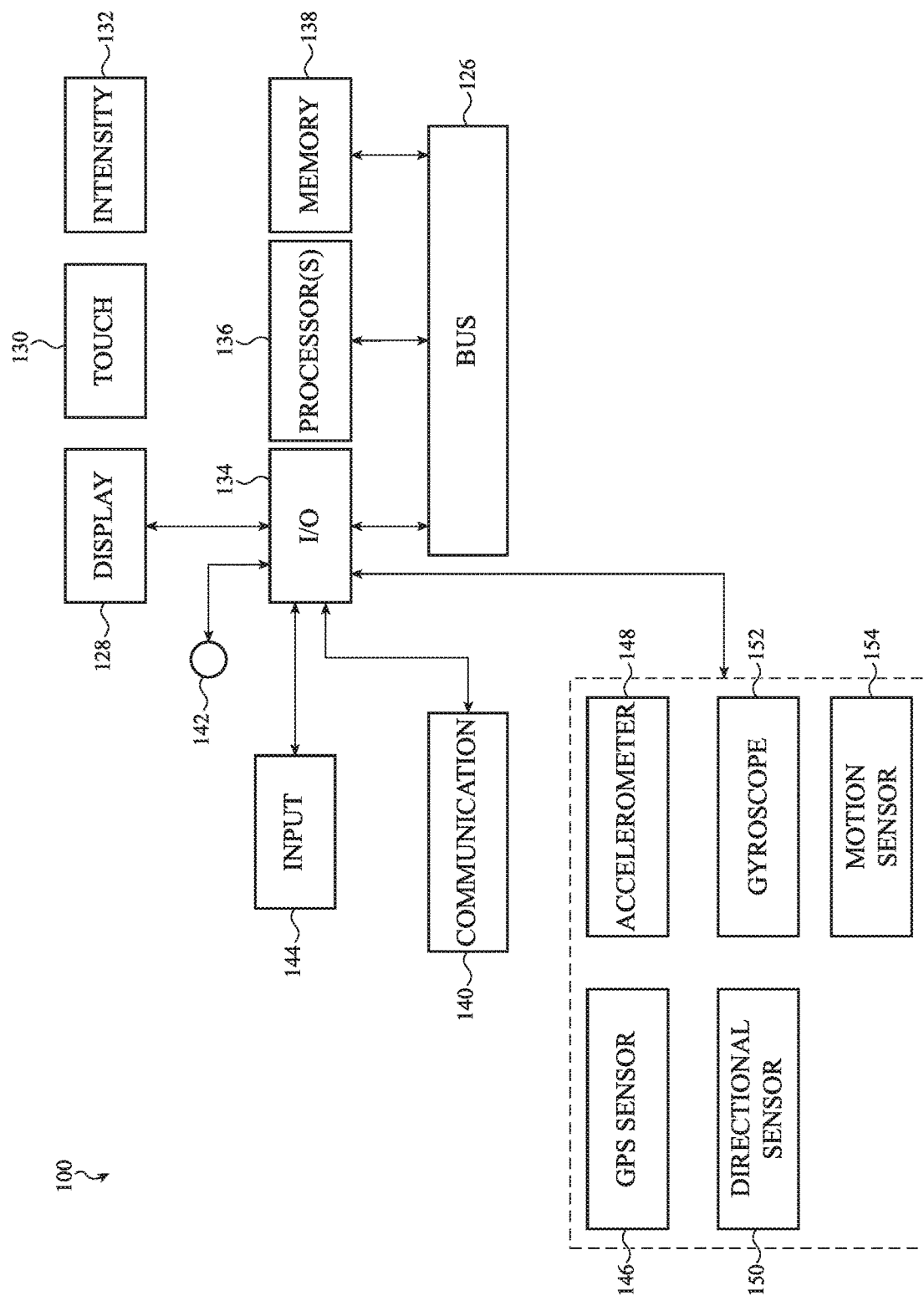
FIG. 1B depicts exemplary components of the device of FIG. 1A.

FIG. 1B depicts exemplary components of device 100. In some embodiments, device 100 has bus 126 that operatively couples I/O section 134 with one or more computer processors 136 and memory 138. I/O section 134 can be connected to a display 128, which can have touch-sensitive component 130 and, optionally, intensity sensor 132 (e.g., contact intensity sensor). In addition, I/O section 134 can be connected with communication unit 140 for receiving application and operating system data, using Wi-Fi, Bluetooth, near field communication (NFC), cellular, and/or other wireless communication techniques. Device 100 can include input mechanisms 142 and/or 144. Input mechanism 142 is, optionally, a rotatable input device or a depressible and rotatable input device, for example. Input mechanism 142 is, optionally, a button, in some examples. Device 100 optionally includes various sensors, such as GPS sensor 146, accelerometer 148, directional sensor 150 (e.g., compass), gyroscope 152, motion sensor 154, and/or a combination thereof, all of which can be operatively connected to I/O section 134.

Memory 138 of device 100 can include one or more non-transitory computer-readable storage mediums, for storing computer-executable instructions, which, when executed by one or more computer processors 136, for example, can cause the computer processors to perform the techniques that are described here (such as those performed by camera selection logic, the focus control logic, and the various controllers and modules associated therewith that are discussed in more detail below). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

The processor 136 can include, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute an operating system and applications of device 100, as well as to facilitate capturing of images as described herein. Device 100 is not limited to the components and configuration of FIG. 1B, but can include other or additional components in multiple configurations.

Returning to FIG. 1A, the cameras within a multi-camera system 102 have fields of view that at least partially overlap with each other. In other words, the device 100 may include an additional camera or cameras (not shown) that are not considered part of the multi-camera system 102 if the field(s) of view for the additional camera(s) do not at least partially overlap the field of view of at least one camera within the multi-camera system 102. For example, device 100 may comprise a front-facing camera (not shown) that faces in an opposite direction of the first camera 104 and the second camera 106 (as well as any other cameras of the multi-camera system 102), and thus would not be considered part of the multi-camera system 102.

Similarly, a depth sensor 110 may be considered part of a multi-camera system 102 if it is positioned and arranged within device 100 such that the depth sensor 110 is able to obtain depth information at one or more points within a field of view of one or more of the cameras of the multi-camera system 102. The device 100 may comprise one or more depth sensors (e.g., a depth sensor on a front of the device that faces in an opposite direction of the cameras of the multi-camera system 102, and thus are not considered part of the multi-camera system 102. It should be appreciated that a device may include more than one multi-camera systems (e.g., a first multi-camera system on one side of the device and a second multi-camera system on a second side of the device), each of which may optionally comprise a respective depth sensor, and some or all of the multi-camera systems may be configured to utilize the various methods and techniques described here.

Figure 1C:
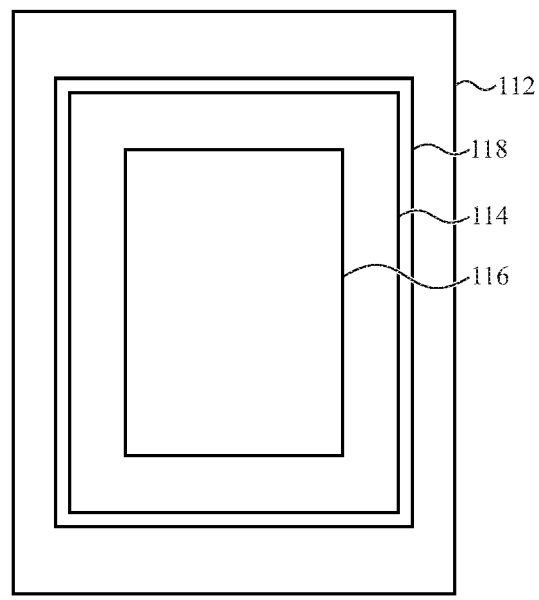
FIG. 1C shows a representation of the fields of views of the cameras of the multi-camera system of FIG. 1A.

The cameras of the multi-camera system 102 may have different focal lengths, which may result in the cameras having different field of view sizes. For example, FIG. 1C shows example field of views for the cameras of the multi-camera system 102 depicted in FIG. 1A. The first camera 104 may have a first field of view 112, the second camera may have a second field of view 114, and the third camera 108 may have a third field of view 116. As shown there, the field of view 112 of the first camera 104 may have a wider (i.e., larger) field of view than both the field of view 114 of the second camera 106 and the field of view 116 of the third camera 108. Preferably the first field of view 112 fully encompasses both the second field of view 114 and the third field of view 116 (i.e., so that there is no portion of the second field of view 114 or the third field of view 116 that is not also part of the first field of view 112), but need not. Similarly, the field of view 114 of the second camera 106 may have fully encompass the field of view 116 of the third camera 108. While the first field of view 112, second field of view 114, and third field of view 116 as depicted in FIG. 1C assume a fixed focal length for each of the first camera 104, second camera 106, and third camera 108, it should be appreciated that in some instances, one or more of the cameras of the multi-camera system may include some level of optical zooming capabilities (which may result in a field of view that varies in size based on the zoom level). For the purpose of this application, the arrangement of field of views depicted in FIG. 1C may be assumed to be the widest possible field of view for each camera.

In general, the size of the field of view for a camera is inversely related to the focal length of the camera. In other words, the longer the focal length a camera, the narrower it's field of view will be. The choice of a camera's field of view may impact the situations in which a particular camera may be useful. For example, cameras with longer focal lengths (and narrower field of views) are often used in telephoto imaging where it is desirable to increase the magnification of a subject at farther distances, while cameras with shorter focal lengths (and wider field of views) are often used in instances where it is desirable to capture more of a scene (e.g., landscape photography).

Also shown in FIG. 1C is a field of coverage 118 for depth sensor 110, which encompasses the area in a scene across which the depth sensor 110 may calculate depth information for the scene. It should be appreciated that depending on the design of the depth sensor 110 (as will be discussed in more detail below), the depth sensor 110 may not calculate depth values for every point within the field of coverage 118. Instead, the field of coverage 118 is intended to reflect the widest lateral extent to which the depth sensor is capable of providing depth information. For the purpose of this application, the field of coverage 118 is represented by a rectangle, where depth sensor 110 is capable of providing depth information for at least one point on each side of the rectangle.

As mentioned above, the field of coverage 118 for depth sensor 110 at least partially overlaps some or all of fields of view of the cameras of the multi-camera system 102. In some variations, it may be desirable to have the field of coverage 118 fully encompass the fields of view for one or more cameras. For example, in the example shown in FIG. 1C, the field of coverage 118 of depth sensor 110 may fully encompass the field of view 114 of the second camera 106 (as well as the field of view 116 of the third camera 108), while not fully encompassing the field of view 112 of the first camera 104. In other variations, the field of coverage 118 may fully encompass the fields of view of all of the cameras in the multi-camera system 102 (which, in the variation of device 100 shown in FIG. 1A would include the fields of view of each of the first camera 104, second camera 106, and third camera 108). In still other variations, the field of coverage 118 may fully encompass a single camera field of view (e.g., the field of view 116 of the third camera 108 in the variation of the multi-camera system 102 shown in FIG. 1C) while not fully encompassing the remaining camera fields of view.

The depth sensor 110 may be any suitable system that is capable of calculating the distance between the depth sensor 110 and various points in the scene. The depth sensor may generate a depth map including these calculated distances, some or all of which may be used in the various techniques described below. The depth information may be calculated in any suitable manner. In one non-limiting example, a depth sensor may utilize stereo imaging, in which two images are taken from different positions, and the distance (disparity) between corresponding pixels in the two images may be used to calculate depth information. In another example, a depth sensor may utilize structured light imaging, whereby the depth sensor may image a scene while projecting a known pattern (typically using infrared illumination) toward the scene, and then may look at how the pattern is distorted by the scene to calculate depth information. In still another example, a depth sensor may utilize time of flight sensing, which calculates depth based on the amount of time it takes for light (typically infrared) emitted from the depth sensor to return from the scene. A time-of-flight depth sensor may utilize direct time of flight or indirect time of flight, and may illuminate the entire field of coverage 118 at one time, or may only illuminate a subset of the field of coverage 118 at a given time (e.g., via one or more spots, stripes, or other patterns that may either be fixed or may be scanned across the field of coverage 118).

In practice, the depth sensor 110 may have a limited operating range (i.e., the range of scene depths for which the depth sensor 110 may be able to provide depth information). Generally, the operating range of a depth sensor 110 includes a minimum distance and a maximum distance that the depth sensor 110 can output (e.g., the depth sensor 110 will not return a distance value for objects closer than the minimum distance or farther than the maximum distance), although it should be appreciated that in some instances the minimum distance may be zero (i.e., the depth sensor 110 may be able to identify objects in contact with a portion of the device 100 and/or depth sensor 110). In some instances, the depth sensor 110 may be configured to provide confidence information associated with the depth information, which represents the relative accuracy of the depth information provided by the depth sensor. By giving an indication of the accuracy of the depth information, the depth sensor 110 may expand the operating range to include shorter distances for which the depth calculation may be less reliable. In these instances, the confidence information may allow various systems in the device to choose which portion of the operating range to use when receiving depth information. For example, the device 100 may be configured to use the full operating range of the depth sensor 110 in some contexts, but may only use a subset of the operating range (e.g., a portion of the operating range associated with higher confidence values) in other contexts.

In some variations, there may be a portion of the operating range of the depth sensor 110 for which the depth information does not include depth values for a given point in the scene, but instead includes a depth range. In other words, if an object is positioned within a certain range of distances, the depth sensor 110 may be able to indicate that the object is positioned within that range of distances without specifying a particular depth within that range (e.g., in a non-limiting example, the depth sensor 110 may be configured to output "less than 20 cm" for any points in the scene where an object is within 20 cm of the depth sensor 110).

Figure 1D:
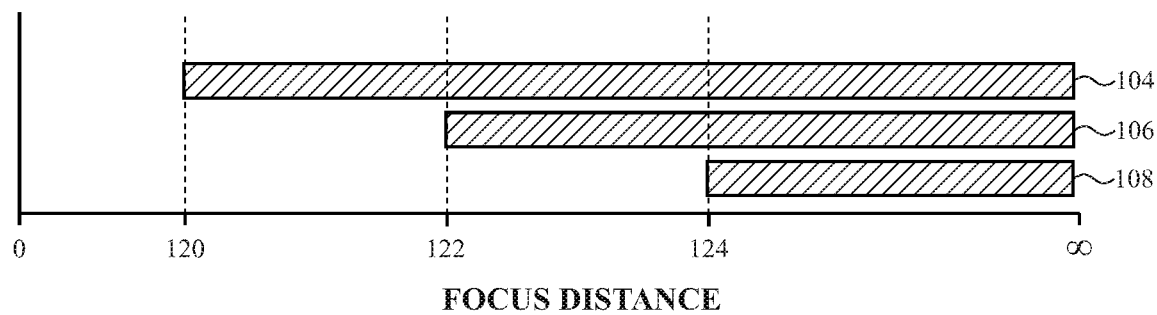
FIG. 1D shows a chart representing the focusing ranges of the cameras of the multi-camera system of FIG. 1A.

Similarly, each camera has a minimum object distance (also known as the minimum focus distance), which represents the shortest distance in a scene at which the camera can focus (and thus the closest an object can be to the camera while still being in focus). FIG. 1D shows an example of the ranges across which each camera of the multi-camera system 102. As shown there, the first camera 104, second camera 106, and third camera 108 may have, respectively, a first minimum object distance 120, a second minimum object distance 122, and a third minimum object distance 124. In general, the minimum object distance 120 of the first camera 104 is less than the minimum object distance 122 of the second camera 106. The minimum object distance 122 of the second camera 106 may in turn be less than the minimum object distance 124 of the third camera 108. In the graph shown in FIG. 1D, it is assumed each of the first camera 104, the second camera 106, and the third camera 108 have autofocus capabilities are able to focus to infinity, which allows each camera to selectively focus on objects ranging from that camera's minimum object distance to infinity. In these instances, each camera may be moveable across a range of focus positions, where one end of the range (referred to herein as the "macro focus position") corresponds to the minimum object distance of that camera.

It should be appreciated that not all of the cameras of the multi-camera system 102 need to have adjustable focus capabilities, and in some instances may include one or more fixed focus cameras. It is preferred, however, that at least two cameras have autofocus capabilities, as will be discussed in more detail below. When a camera of the multi-camera system is configured with autofocus capabilities, that camera may be configured in any suitable manner as will be readily apparent to those skilled in the art. In general, each camera of the multi-camera system 102 may comprise an image sensor and a lens, which comprises one or more lens elements configured to direct light received by the camera toward the image sensor (the lens may further comprise a lens barrel that houses some or all of the lens elements). In instances where a camera is configured with autofocus capabilities, the camera may comprise an actuator that may be configured to create relative movement between the image sensor and one or more lens elements of the lens along an optical axis of the lens (e.g., by movement of the image sensor and/or the one or more lens elements of the lens). Additionally or alternatively, the lens may comprise a variable focus lens element (e.g., a liquid lens), which may be actuated to adjust the optical power of the lens element. For the purpose of this application, the "focus position" of a camera may refer to the relative positioning and/or configuration of the components that can actively be moved or adjusted to change the focus of the camera. Additionally, the camera may optionally be further configured to provide optical image stabilization, in which one or more optical components of the camera (e.g., image sensor, the lens or one or more lens elements thereof, one more prisms or mirrors) are moved laterally relative to the optical axis.

Figure 2:
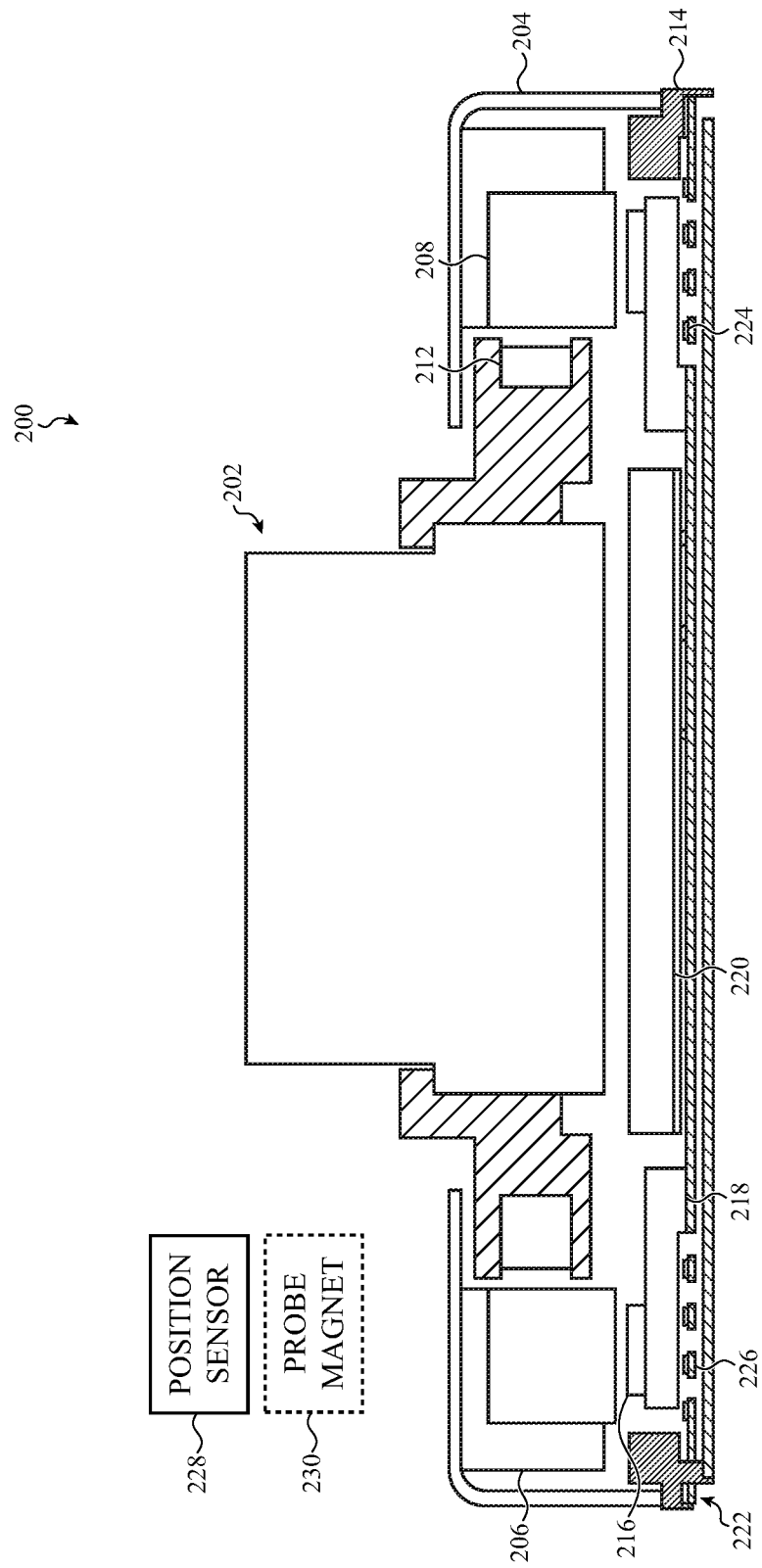
FIG. 2 shows a cross-sectional side view of an illustrative example of a camera that may be used with the multi-camera systems described herein.

FIG. 2 shows a cross-sectional side view of an illustrative example of a camera 200 that may be used with the multi-camera systems described herein. The camera 200 may comprise a lens 202, an image sensor 220, and a housing 204, and may include an actuator that is configured to move the lens 202 along an optical axis of the camera to adjust the focus of the camera and to move the image sensor 220 transverse to the optical axis to perform optical image stabilization. To move the lens 202 (which may contain one or more lens elements and a lens barrel, such as discussed above), the lens 202 may be attached to a coil 212 (e.g., via a lens carrier 210, which is configured to hold both the lens 202 and the coil 212). The lens 202 and lens carrier 210 may be suspended relative to a stationary portion of the camera 200 (e.g., relative to a magnet holder 206) via one or more suspension elements (not shown), such as one or more flexures (e.g., leaf spring(s), suspension wire(s), flexure arms(s), or the like) and/or one or more bearings (e.g., ball bearing(s), roller bearing(s), or the like). The magnet holder 206 may hold one or more magnets 208, and the coil 212 may be positioned within the magnetic field of the magnets 208 such that when current is driven through the coil 212, Lorentz forces are generated that can create relative movement between the coil 212 and magnets 208, which in turn may move the lens 202 along the optical axis of the camera.

To move the image sensor 220 in one or more directions perpendicular to the optical axis, the camera 200 may comprise a stationary base 214 (which may be fixed relative to housing 204) and a frame 222 that moveably connects the image sensor 220 to the base 214 via a plurality of flexures 226. In some instances the flexures 226 may support electrical traces 224, which may be used to carry signals to and from the image sensor 220. Also shown there is a printed circuit 218 which carries one or more coils 216 (which are separate from the coil 212 carried by the lens carrier 210).

The coils 216 may be positioned within the magnetic field of the one or more magnets (e.g., magnets 208 in the variation shown in FIG. 2) such that when current is driven through the coils 216, Lorentz forces are generated that can create relative movement between the coils 216 and magnets 208, which in turn may move the image sensor 220 perpendicular to the optical axis of the camera.

The camera 200 may further comprise a position sensor 228, which is configured to detect the relative position of lens 202 within camera 200. For example, the position sensor may comprise a magnetic sensor (e.g., a hall effect sensor, tunnel magnetoresistance (TMR) sensor, or the like) that is positioned to measure the magnetic field of a magnet in the camera 200 (e.g., a probe magnet 230 as shown in FIG. 2). The position sensor 228 may be fixed with respect to the lens 202 (e.g., carried by the lens carrier 210) while the probe magnet 230 may be fixed with respect to the magnet holder 206, or vice versa. As the lens 202 is moved to adjust the focus of the camera 200, the position sensor 228 will move with respect to the probe magnet 230 and will measure the change in magnetic flux as it moves through the magnetic field of the probe magnet 230. This may, in turn, measure the relative position of the lens 202 within the camera 200. While position sensor 228 is discussed above as detecting a position of the moving lens 202, it should be appreciated that the cameras of the multi-camera systems described here may include position sensors that measure the position of any or all of the moving components (e.g., an image sensor, lens, and/or a lens element of the lens) of that camera.

When a camera of the multi-camera systems described here are configured with autofocus capabilities, that camera may be able to automatically set a focus position for the camera and may adjust the position and/or configuration of one or more optical components of the camera accordingly. The focus position may be determined by a camera in any suitable manner. In some instances, a camera may be configured to perform phase detect autofocus (PDAF), in which at least some of the pixels of the image sensor are configured to have a restricted range of incident angles that may be collected by those pixels. These "asymmetric" pixels may be formed by splitting a camera pixel into multiple separate photodiodes or selectively masking a portion of the photodiode of a pixel. Each asymmetric pixel preferentially receives light from a given direction, and pixels associated with a common direction can be grouped together. One group of pixels will have disparate signals from another group of pixels when the image is not in focus, but well-matched signals when the image is in focus. Thus, the groups of pixels may provide information that can be used by the camera to adjust the focus of an image (e.g., using phase difference between the groups of pixels). An example of PDAF used on a mobile device is described in U.S. Pat. No. 10,440,301, titled "Image capture device, pixel, and method providing improved phase detection auto-focus performance," and which is hereby incorporated by reference in its entirety.

Additionally or alternatively, a camera may be configured to use contrast based autofocus (CBAF) to select a focus position, in which the intensity difference between nearby pixels of an image sensor is compared as a function of focus position. As an object moves into focus, the intensity difference between nearby pixels will increase, and thus the focus position may be adjusted until a maximum (or near-maximum) contrast is determined for a target region of the image sensor. It should be appreciated that cameras may be capable of performing multiple autofocus techniques, and may choose from different techniques from depending on the scene conditions, such as will be discussed in more detail below.

While a camera's autofocus techniques may be used to set a focus position for a camera, it may also be used to estimate a distance for one or more objects in a scene. For example, if a camera has focused on an object in the scene, the focus position for the camera (e.g., the position of lens 202 in the variation of camera 200 described above with respect to FIG. 2) may be measured (e.g., via a position sensor such as position sensor 228 described above with respect to FIG. 2), and a predetermined relationship between focus position and scene distance may be used to estimate the object distance.

Returning to FIG. 1A, the multi-camera system 102 may be used to capture images during one or more photography modes (e.g., a photo mode that can capture still images, a video mode that may capture videos, a panoramic mode that can capture panoramic photo, a portrait mode that can capture a still photo having an artificial bokeh applied, or the like). In general, during these modes the device 100 may display a camera user interface that displays a "live preview." The live preview is a stream of images captured by a camera of the multi-camera system and represents the field of view (which may be a subset of the field of view of one of the cameras) that will be captured when the camera initiates a media capture event. In other words, the live preview allows a user to see what portion of the scene is currently being imaged and to decide when to capture a photo or video.

When the camera initiates a media capture event (e.g., under some predetermined conditions or where a user gives a command by interacting with a shutter control on the user interface, pressing a designated button on the device, giving a voice command, or the like), the camera will capture media depending on the current camera mode (e.g., capture a photo when in a photo mode or capture a video when in a video mode), which may then be stored locally on the device 100 or transmitted to a remote server for storage. It should be appreciated that in some instances there may be a frame buffer of image frames captured by multi-camera system 102, and that some frames that were collected before the initiation of the media capture event may be used in generating the captured media that is stored or transmitted.

During these photography modes, one or more cameras of the multi-camera system 102 may be actively capturing image frames during a given period of time, and the multi-camera system 102 may designate a "primary" camera (any other active cameras will be referred to as "secondary" cameras). If only a single camera is active at a time, that camera will be the primary camera. It may be desirable, however, for two or more cameras to be active at the same time, and typically the primary camera is prioritized in one or more ways. For the purpose of this application, however, the primary camera is considered to be the camera from which the live preview is generated (i.e., frames captured by the camera will be used as the images for the live preview, although these frames may be cropped or otherwise modified when generating the live preview).

In some variations, the primary camera may be configured to capture image frames at a higher frame rate than the frame rates of the secondary cameras. Additionally or alternatively, when a media capture event is initiated, image frames captured by the primary camera are used to generate the captured media. In some instances, information from the secondary cameras (including frames captured by one or more secondary cameras) may be used to assist in operation of the primary camera and/or to modify the image frames captured by the primary camera. As a non-limiting example, an image frame from a secondary camera may be combined as part of an image fusion operation with an image frame from a primary camera (acting as a reference frame) to provide a single composite image.

Camera Switchover Techniques

In general, the multi-camera system 102 may switch between different primary cameras depending on the desired capture mode and/or scene conditions. For example, U.S. Pat. No. 10,701,256, titled "Switchover control techniques for dual-sensor camera system," which is hereby incorporated by reference in its entirety, discusses techniques for switching between cameras in a multi-camera system based on a desired zoom value, estimated scene brightness, and/or an estimated focus distance. While these techniques may be useful in many instances (and may be used in conjunction with the switchover techniques described here), it may also be desirable to switch away from a primary camera when a target object being imaged by the primary camera moves closer than the primary camera's minimum object distance, otherwise the target object will be out of focus in any images captured by the primary camera.

Accordingly, when a target object is closer than a minimum object distance of a camera, a multi-camera system may be configured to change the primary camera to another camera having a shorter minimum object distance, which may allow for the multi-camera system (e.g., via the new primary camera) to continue being able to focus on the target object at these closer distances. For example, in the multi-camera system 102 described above with respect to FIG. 1A-1D, the second camera 106 may be selected as a primary camera while imaging a target object under certain circumstance. If the target object moves to a distance closer than the minimum object distance 122 of the second camera 106, selecting the first camera 104 as the primary camera may allow the first camera 104 to capture images with the target object in focus (whereas the second camera 106 may no longer be capable of focusing on the target object).

To provide for a smooth user experience, it may be desirable to maintain a consistent level of zoom when selecting a new primary camera. Since the first camera 104 has a wider field of view 112 than the field of view 114 of the second camera 106, it may be necessary to crop images from the first camera to match the field of view of images captured by the second camera 106 (this may correspond to the full field of view 114 of the second camera 106 or a cropped version thereof). The image quality of a cropped image from the first camera 104, however, may be worse than an image captured by the second camera 106 with the same field of view. Accordingly, it may be desirable to maintain the second camera 106 as the primary camera until the target object reaches the minimum object distance 122 of the second camera 106.

In practice, however, the multi-camera system 102 may not be able to perfectly calculate the distance to the target object (especially at scene depths where depth information from a depth sensor such as depth sensor 110 is less reliable or altogether unavailable), and this may result in situations where a target object is closer than the minimum object distance 122 of the second camera 106, yet the multi-camera system 102 erroneously calculates that the target object is farther than the minimum object distance 122. In such a situation, the second camera 106 may be maintained as the primary camera (even though the first camera 104 is better suited for imaging the target object at that distance), which may result in the target object being out of focus in the live preview and any media captured by the second camera 106.

Accordingly, in one aspect of the present invention, the multi-camera system 102 may be configured to switch primary cameras when imaging a target object near the minimum object distance of a camera while accounting for potential errors in calculating the distance to the target object.

Accordingly, the devices described here may comprise a camera selection logic that is programmed to select a primary camera from a plurality of cameras of the multi-camera system. In instances where a multi-camera system comprises three or more cameras, there may be a single camera selection logic that selects a primary camera from all of the cameras or there may be multiple camera selection logics that each control the switchover between a different pair of cameras of the multi-camera system. For example, a first camera selection logic may select between a first camera and a second camera as a primary camera, and a second camera selection logic may select between the second camera and a third camera as a primary camera. In some instances, the first camera selection logic and the second camera selection logic may be active at different times. Additionally or alternatively, the first camera selection logic and the second camera selection logic may both be active in certain circumstances, such as when the second camera is the primary camera, to determine whether to switch the primary camera from the second camera to either the first camera or the third camera, respectively.

In general, the camera selection logic receives a plurality of inputs comprising object distance estimates from at least one camera in the multi-camera system, respective distance error information associated with each object distance estimate, and the minimum object distance for at least one camera in the multi-camera system. When the multi-camera system comprises a depth sensor, the plurality of camera inputs may optionally further comprise an object distance estimate from the depth sensor (and in some of these variations, may further comprise depth error information associated with the distance estimate from the depth sensor. The camera selection logic selects a camera of the multi-camera system as the primary camera based at least in part on these inputs.

Figure 3:
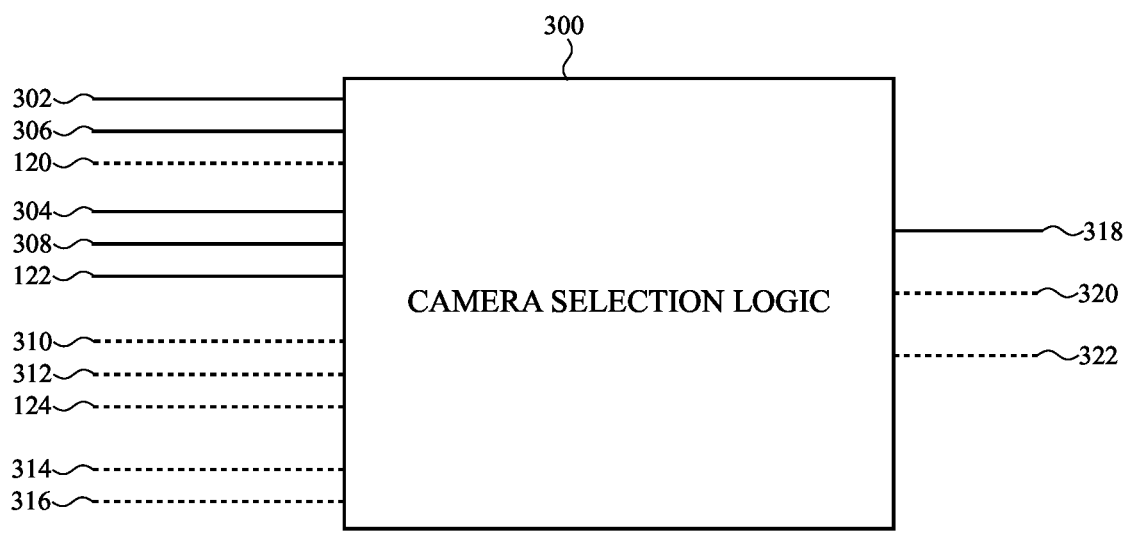
FIG. 3 shows a variation of camera selection logic which may be used to select between a first camera and a second camera as a primary camera.

For example, FIG. 3 shows a variation of camera selection logic 300 which may be used to select a primary camera from a plurality of cameras of a multi-camera system. By way of illustration, the camera selection logic 300 is described here as being used to select one of the first camera 104 or second camera 106 of multi-camera system 102 (described above with respect to FIGS. 1A-1D), although it should be appreciated that the camera selection logic 300 may be configured to select from between three or more cameras (e.g., first camera 104, second camera 106, and third camera 108 of multi-camera system 102) as a primary camera. Additionally, the camera selection logic 300 may be configured to switch between the first and second as the primary camera when a target object is near the minimum object distance of the second camera. It should be appreciated that what is considered "near" the minimum object distance is dependent on the accuracy of the object distance estimates that are used to select the primary camera, as will be discussed in more detail below.

As shown there, the camera selection logic 300 may receive a first object distance estimate 302 to a target object calculated using the first camera 104 and a second object distance estimate 304 to the target object calculated using the second camera 106. The camera selection logic 300 may additionally receive a first distance error information 306 associated with the first object distance estimate 302 and a second distance error information 308 associated with second object distance estimate 304. The camera selection logic 300 may further receive a minimum object distance 122 of the second camera 106. Optionally, the camera selection logic 300 may receive a third object distance estimate 310 to the target object from the third camera 108, as well as a third distance error information 312 associated with the third object distance estimate 312. The camera selection logic 300 may also receive the minimum object distance 120 of the first camera 104 and/or the minimum object distance 124 of the third camera 108 (in variations where the camera selection logic 300 receives the object distance estimate 310 from the third camera 108) as inputs. Additionally or alternatively, the depth sensor 110 may also provide an object distance estimate for the target object (e.g., a fourth object distance estimate 314 shown in FIG. 3) and a distance estimate error associated with the object distance estimate (e.g., a fourth distance error information 316).

Using these inputs, the camera selection logic 300 may be configured to select one of the first camera 104 and the second camera 106 as a primary camera (as indicated by a first output 318 in FIG. 3). Additionally, the camera selection logic 300 may optionally be configured to use the object distance estimate inputs (e.g., some or all of first object distance estimate 302, second object distance estimate 304, third object distance estimate 310, and fourth object distance estimate 314) as well as the distance error information inputs associated with these distance estimate inputs to select the focus position for one or more of the cameras of the multi-camera system 102 (as indicated by output 320). Additionally or alternatively, the camera selection logic may optionally be further configured to select a zoom level for the selected primary camera (as indicated by output 322). For example, when switching the primary camera from the second camera 106 to the first camera 104, it may be configured to maintain the same zoom level that was set when the second camera 106 was the primary camera (and vice versa). In these instances, the camera selection logic may be configured to select a zoom level for the first camera that matches a zoom level that was selected for the second camera when it was the primary camera. Because the first camera 104 has a larger field of view than the second camera 106, this may entail cropping images captured by the first camera 104 to achieve the selected zoom level, and the device 100 may display a cropped version of the images captured by the first camera 104 during live preview as the first camera 104 becomes the primary camera. It should be appreciated that the zoom level may also be adjusted in response to other camera operations (e.g., after receiving a user input to change the zoom level or changing a photography mode), and the output 322 of camera selection logic 300 may be adjusted accordingly.

The various inputs to the camera selection logic 300, as well as how the camera selection logic 300 may use these inputs, are discussed in more detail below:

Target Object

As mentioned above, the camera selection logic 300 may receive one or more object distance estimates to a target object. Specifically, the target object may correspond to a portion of the scene that is selected by the device as a region of interest (ROI). One or more images (and optionally depth information) captured by one or more cameras of the multi-camera system may be analyzed to identify the ROI that will act as the target object. In some instances, a ROI is selected from an image (or images) captured by one camera of the multi-camera system, and a corresponding ROIs are selected for the remaining cameras (and any depth sensors) of the multi-camera system. In these instances, the corresponding ROIs may be adjusted to account for differences in field curvature and/or the relative of positioning of the cameras and depth sensors within the device. For the purpose of this application, the individual ROIs selected for each of the cameras and depth sensors that are associated with a target object are collectively referred to as the ROI for the target object.

In some instances, an object detection algorithm may be used to identify one or more objects and/or faces in the scene, and the multi-camera system may select an ROI associated with one or more of the detected objects and/or faces as the target object. In instances where multiple objects are detected, the multi-camera system may select an ROI that encompasses two or more objects (it should be appreciated that the ROI may include two sections that need not be contiguous) or may select an ROI that corresponds to a single object (which may be selected from the multiple objects based on one or more predetermined criteria). In some instances, the ROI for the target object may be selected at least in part based on a user input (e.g., a user may tap on a portion of the screen to designate an object and/or portion of the scene as the target object). In the absence of detected objects/faces and/or user input, the multi-camera system may set a default ROI as the target object. It should be appreciated that the target object may change over time as the scene changes and/or newer user inputs are received.

Object Distance Estimates

When a target object is selected, some or all of the cameras of the multi-camera system may be used to estimate a distance from the multi-camera system to the target object. For example, autofocus information from each camera may be used to calculate a respective object distance estimate for the target object. Specifically, a camera may use one or more autofocus techniques to focus on the target object (such as discussed in more detail above) and may measure a focus position at which the camera is focused on the target object (e.g., via a position sensor as discussed above). A predetermined relationship between the focus position and object distance (which may be unique for each camera) may be utilized such that the measured focus position may be used to calculate the object distance estimate for the target object. It should be appreciated that the when the camera selection logic is described as receiving an object distance estimate from a camera, the camera selection logic may receive a distance value or a focus position value (which may later be converted to a distance value, if so desired, using the predetermined relationship between the focus position and object distance for that camera) as the distance object estimate.

When the target object is closer than the minimum object distance for a camera, that camera may no longer be able to focus on target object. In some of instances, the camera selection logic may not actively receive an object distance estimate from that camera or may receive and indicator that the target object is less than the minimum object distance of the camera. In other instances, the camera selection logic may receive an extrapolated object distance estimate from a camera. This object distance estimate may be calculated using defocus information measured by the camera at a predetermined focus position at which the target object may not be in focus. Because the camera may not be able to achieve a focus position to be able to focus the camera on the target object, the object distance estimate may be associated with an extrapolated focus position, which represents a hypothetical focus position at which the camera would be able to focus on the target object. There may be a predetermined relationship between the extrapolated focus position and the object distance estimate (similar to the above discussion), and thus the camera selection logic may receive either a distance value or a focus position value as the distance object estimate. Extrapolated focus positions and their corresponding object distance estimates will be described below in more detail with respect to FIGS. 5 and 6.

In instances where the multi-camera system comprises a depth sensor, a depth sensor of the multi-camera system may be used to estimate a distance from the multi-camera system to the target object. In these instances, the depth sensor may calculate depth information for a portion of the field of coverage corresponding to the ROI for the target object. When depth information is available for multiples points within the ROI, it should be appreciated that either i) depth information for these multiple points may be provided to the camera selection logic, or ii) this depth information may be downselected, averaged, or otherwise processed to produce a reduced number of distance values (e.g., single distance value that represents the object distance estimate from the depth sensor).

Distance Error Information

As mentioned above, the object distance estimates from the cameras and depth sensors of the multi-camera system may not be perfectly accurate, and the accuracy of these object distance estimates may vary depending on the scene, from unit to unit, and within a given unit over time. For example, when a position sensor measurement is used to calculate a focus position for a camera as discussed above, there may be inaccuracies associated with the position sensor measurement, so that the measured focus position may not reflect the actual focus position of the camera (which in turn may cause a corresponding object distance estimate to not reflect the actual distance to the target object). Accordingly, the device may be configured to maintain distance error information for each camera, which may be used by a camera selection logic when selecting a primary camera.

The distance error information may be any suitable metric or metrics that give an indication of the accuracy of the object distance estimate for that camera. This distance error information typically varies with the value of the object distance estimate for a given camera. For example, the predetermined relationship between the focus position and the object distance estimate for a given may be nonlinear, such that the same inaccuracies in two different focus position will have different impacts on the corresponding object distance estimate depending. This predetermined relationship generally results in the object distance estimate from a camera being more accurate as the focus position approaches the macro focus positioned associated with minimum object distance of the camera.

In some instances, the distance error information for a camera may include a focus position error distribution that represents the probabilities of different measurement errors occurring for a given focus position measurement. This error distribution may be initially generated during factory calibration (e.g., by taking multiple focus position measurements when autofocusing to a target object at a known distance). In some variations, the focus position error distribution (and thus the distance error information) may be considered static, in that the position error distribution is not updated during operation of the device (although a new focus position error distribution may be generated during a subsequent calibration event). In other variations, the focus position error distribution (and thus the distance error information) may be dynamically updated during operation of the device. For example, when the multi-camera system comprises a depth sensor, measurements from the depth sensor that meet a predetermined accuracy/confidence threshold may be treated as ground truth distance for a target object, which may be compared against an object distance estimate calculated for the target object using a focus position measured or extrapolated by the camera, the results of said comparison may be used to update the focus position error distribution.

While the example of distance error information described above comprises a focus position error distribution for a given focus position measurement, it should be appreciated that this may be converted (e.g., using the predetermined relationship between focus position and object distance estimates for a given camera) to an object distance error distribution for a given object distance estimate. It should be appreciated the camera selection logic may receive either a focus position error distribution as an input (which may later be converted to an object distance error distribution, if so desired, using the predetermined relationship between the focus position and object distance estimates for that camera) or an object distance error distribution. Additionally or alternatively, although the device may maintain an error distribution (e.g., a focus position error distribution or an object distance error distribution), the camera selection logic may receive one more metrics derived from that error distribution (e.g., a mean and standard deviation of the distribution) as an input.

Similarly, when a depth sensor is used to provide an object distance estimate for a target object, the object distance estimate may be associated with a corresponding distance error information, which may represent the accuracy of object distance estimate provided by the depth sensor. The distance error information may comprise confidence information such as one or more confidence values, such as described in more detail above.

Minimum Object Distance

The minimum object distance of a camera may vary from unit to unit, and in some instances may vary during operation of the camera. The minimum object distance for a given camera may be initially measured during factory calibration, and may be used by the camera selection logic as an input. It should be appreciated that the value of the minimum object distance for a camera that is received by the camera selection logic is assumed to be the minimum object distance for the camera, although in practice this value may vary from the actual minimum object distance (for example, if a drop event or other reliability causes a permanent change in the relative position between the image sensor and lens of the camera after a minimum object distance has been measured.

In some variations, the minimum object distance of a camera may be considered static, in that the minimum object distance is not updated during operation of the device (although a new minimum object distance may be measured during a subsequent calibration event). In other variations, the minimum object distance may dynamically change during operation of the device. For example, in some variations where the camera is configured to move the image sensor transverse to an optical axis of the camera, unintentional movement of the image sensor along the optical axis during device operation may change the minimum object distance of the camera. For example, in the variation of camera 200 described above with respect to FIG. 2, gravity may cause the image sensor 220 to move along the optical axis (e.g., via sagging of the flexures 226 of frame 222) depending on the camera orientation, which may alter the minimum object distance of the camera 200. In these instances, the multi-camera system 102 may monitor changes in the camera 200 orientation (e.g., as measured by a gyroscope or the like of the device) and update the minimum object distance during device operation based on these changes in camera orientation. In other instances, a camera may change to a different operating mode that uses a reduced range of focus positions during autofocus operations. In these instances, the change in the range of available focus positions may also change the minimum object distance for that camera, which may be reflected in the input to the camera selection logic. Optionally, the device may be configured to determine accuracy information associated with minimum object distance for a camera, which represents the likelihood that the value of the minimum object distance maintained by the device reflects the actual minimum object distance of the camera. This accuracy information may be used as an input (not shown) to the camera selection logic 300 to assist in selecting the primary camera.

It should be appreciated that the some or all of the above inputs to the camera selection logic may vary over time, and that the method of selecting a primary camera using the camera selection logic may be repeated as the inputs to the camera selection logic change. For example, the camera selection logic may be repeated in multiple repetitions as one or more object distance estimate inputs changes (which may be updated as there is relative movement between the device and the scene), as a distance error information input changes for a given object distance estimate, and/or as a minimum object distance input for a given camera changes.

In general, the camera selection logic may be configured to change the primary camera near a minimum object distance of a camera while staying below a threshold probability that a camera will be selected as the primary camera when a target object is closer than the camera's minimum object distance. As a non-limiting example, when the camera selection logic 300 discussed above is used to select the primary camera from between the first camera 104 and the second camera 106, the camera selection logic 300 may be configured such that there is less than a 0.05% chance (or any other suitable predetermined probability) that it will select the second camera 106 as a primary camera when the target object is closer than the minimum object distance 122 of the second camera 106. In this way, the distance error information for the object distances estimates from the cameras of the multi-camera system may factor in to how close the camera selection logic will allow a target object to get to the minimum object distance before switching. In other words, when the object distance estimates are highly accurate, the camera selection logic will allow switching of the primary camera closer to the minimum object distance (because there is a lower likelihood that that an inaccuracy in an object distance estimate will cause an incorrect determination that the target object is positioned farther than the minimum object distance). This may allow for different switching thresholds between different units, or within a unit over time, and may be particularly advantageous in instances where a depth sensor of the multi-camera system is unable to provide reliable depth information for the distances at which the target object is positioned.

The camera selection logic 300 may use any suitable technique for selecting a primary camera from the inputs discussed above. For example, in some variations, the camera selection logic 300 may comprise a neural network that has been trained to take the minimum object distance(s), object distance estimate(s), and associated distance error information, and output a primary camera selection.

Figure 4:
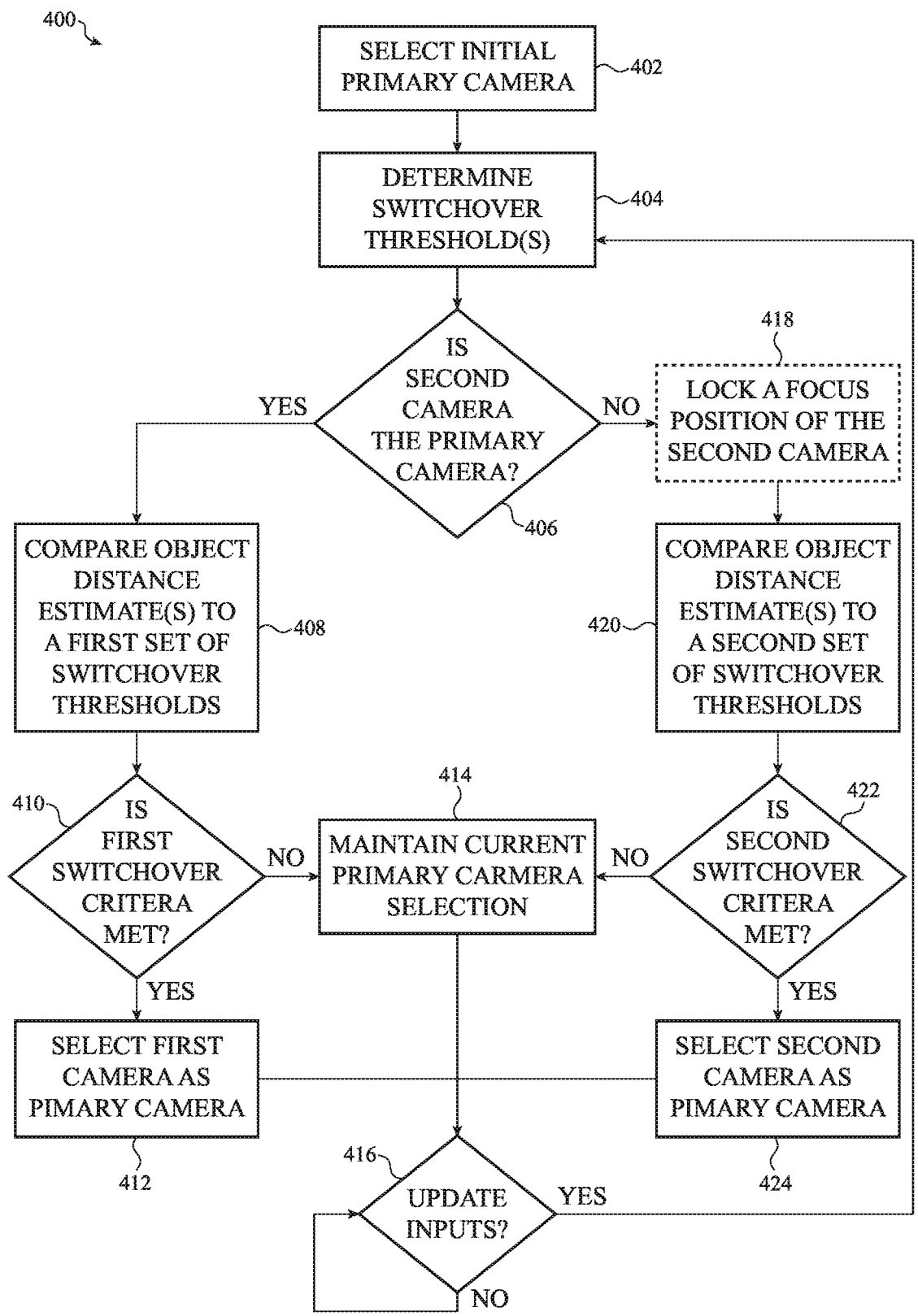
FIG. 4 shows a flowchart that represents an embodiment of a method of selecting a primary camera.

As another example, FIG. 4 shows a flowchart that represents an example method 400 that camera selection logic 300 of FIG. 3 may use to select a primary camera from a plurality of cameras of a multi-camera system. While shown there as selecting one of a first camera and a second camera as the primary camera (where the second camera has a longer minimum object distance than the first camera), it should be appreciated that description of method 400 may be extended to select the primary camera from between three or more cameras.

As shown in FIG. 4, the camera selection logic 300 may be configured to make an initial primary camera determination at step 402. This may occur when the multi-camera system is first initialized to begin image capture operations, or when the multi-camera system switches between different photography modes (such as those described in more detail above). In some instances, there may be a default camera (e.g., the second camera) that is always selected (or a respective default camera for each photography mode). In other instances, the initial selection may be dependent on the scene content. For example, the multi-camera system may perform a startup operation where one or more cameras capture one or more preliminary images before initiating the live preview (e.g. to identify a target object in the scene, set initial autofocus, color balancing, and/or exposure settings, or the like), and the initial primary camera selection may occur during this startup (e.g., by looking at one or more object distance estimates to a target object).

At step 404, the camera selection logic 300 may determine one or more switchover thresholds based one or more of the inputs to the camera selection logic 300, which may be used in selecting the primary camera. The camera selection logic 300 uses at least i) the minimum object distance of at least one camera (e.g., the minimum object distance of the second camera 106) and ii) the distance error information associated with at least one of the object distance estimates to determine the switchover thresholds (e.g., using a lookup table, a predetermined relationship between the inputs and the switchover threshold(s), or the like). While the camera selection logic 300 may use a distance error information associated with a single object distance estimate to determine a given switchover threshold, in some instances may be preferable to use the distance accuracy information associated with two or more object distance estimates when calculating a given switchover threshold. In some instances a second threshold may be set using a predefined modification to a first threshold, but for the purpose of this application, the second threshold would be considered as having been determined using the same inputs that were used to determine the first threshold. By utilizing distance accuracy information and the minimum object distance of a camera, the selection of switchover threshold(s) may be tailored to achieve a switchover near the minimum object distance while staying below a threshold probability that the camera will be selected as the primary camera when a target object is closer than the camera's minimum object distance, such as discussed above.

In some instances, the camera selection logic 300 may be configured to calculate plurality of sets of switchover thresholds, where each set of switchover threshold is used to control a different switchover between two cameras of the multi-camera system 102 as the primary camera. For example, the switchover thresholds calculated at step 404 may comprise a first set of switchover thresholds that may be used to determine whether to change the primary camera from a second camera to a first camera and a second set of switchover thresholds that may be used to determine whether to change the primary camera from the first camera to the second camera. At step 406, the camera selection logic 300 may determine which camera of the multi-camera system is currently the primary camera. If the second camera is the primary camera, the method may determine whether to maintain the second camera as the primary camera or switch to the first camera as the primary camera. If the first camera is the primary camera, the method may determine whether to maintain the first camera as the primary camera or switch to the second camera as the primary camera Specifically, if the second camera is the primary camera, the camera selection logic 300 may compare one or more subject distance estimates to the first set of switchover thresholds at step 408. If this comparison meets a first switchover criteria (as indicated in step 410), the camera selection logic 300 may switch the primary camera to a different camera (e.g., select the first camera as the primary camera as indicated in step 412). If the comparison fails to meet the first switchover criteria, the camera selection logic 300 may maintain the second camera as the primary camera (as indicated in step 414). After the camera selection logic 300 either selects the first camera as the primary or maintains the second camera as the selected primary camera, the camera selection logic 300 may keep that camera as the selected primary camera until one or more of the inputs to the camera selection logic 300 are updated (at step 416) at which point a new iteration of the method 400 may be started again at step 404.

In one preferred embodiment, the first set of switchover thresholds comprises a single switchover threshold that is determined using the minimum object distance 122 of the second camera 106, first distance accuracy information 306 associated with a first object distance estimate 302 for a target object calculated using the first camera 104, and second distance accuracy information 308 associated with a second object distance estimate 304 for a target object calculated using the second camera 106. In these variations each of the first object distance estimate 302 and the second object distance estimate 304 may be compared to this switchover threshold (e.g., at step 408), and the camera selection logic 300 may determine that the first switchover criteria is met (and thereby switch the primary camera to the first camera 104) if at least one of the first object distance estimate 302 and the second object distance estimate 304 is less than the switchover threshold.

In other embodiments, the first set of switchover thresholds may comprise a plurality of thresholds. In these embodiments, different object distance estimates may be compared to different switchover thresholds of the first set of switchover thresholds. For example, the first object distance estimate 302 may be compared to a first switchover threshold and the second object distance estimate 304 may be compared to a second switchover threshold. The camera selection logic 300 may determine that the first switchover criteria is met (and thereby switch the primary camera to the first camera) if either the first object distance estimate 302 is less than the first switchover threshold or the second object distance estimate 304 is less than the second switchover threshold (or both are less than their corresponding switchover thresholds). It should be appreciated that when a third camera 108 and/or a depth sensor 110 are used to generate object distance estimates, these object distance estimates may also be compared to one or more of the first set of switchover thresholds in step 408, which may further be used to determine whether the first switchover criteria is met in step 410.

Similarly, when the first camera 104 is the primary camera at step 406, the camera selection logic 300 may compare one or more subject distance estimates to the second set of switchover thresholds at step 420. If this comparison meets a second switchover criteria (as indicated in step 422), the camera selection logic 300 may switch the primary camera to a different camera (e.g., select the second camera 106 as the primary camera as indicated in step 424). If the comparison fails to meet the first switchover criteria, the camera selection logic 300 may maintain the first camera 104 as the primary camera (as indicated in step 414). After the camera selection logic 300 either selects the second camera 106 as the primary or maintains the first camera 104 as the selected primary camera, the camera selection logic 300 may keep that camera as the selected primary camera until one or more of the inputs to the camera selection logic 300 are updated (at step 416) at which point a new iteration of the method 400 may be started again at step 404.

The second set of switchover thresholds may comprise a single switchover threshold or a plurality of switchover thresholds, such as discussed in more detail above. For example, step 420 may comprise comparing the first object distance estimate 302 and the second object distance estimate 304 to a first switchover threshold from the second set of switchover thresholds. In some of these variations, the second switchover criteria is met if both the first object distance estimate 302 and the second object distance estimate 304 are above the first switchover threshold (or alternatively, the second switchover criteria is met if at least one of the first object distance estimate 302 and the second object distance estimate 304 is above than the first switchover threshold). In other variations, the second set of switchover thresholds may comprise a plurality of thresholds, wherein the first object distance estimate 302 is compared to a first switchover threshold of the second set and the second object distance estimate 304 is compared to a second switchover threshold of the second set.

While one or more switching thresholds of the first set may be the same as one or more switching thresholds of the second set, it may be desirable to select different switching thresholds between the first set and the second set to add hysteresis to the switching behavior. For example, a first switching threshold belonging to the first set (which may be the only switching threshold of the first set) and a second switching threshold belonging to the second set (which may be the only switching threshold of the second set) may be selected such that they a separated by a predetermined separation amount. In some of these instances, the first switching threshold may be determined as discussed above (e.g., using at least one minimum object distance and distance error information from at least one object distance estimate), and the second switching threshold may be determined by adding the predetermined separation amount to the first switching threshold. It should be appreciated that the predetermined separation amount may be static or may be varied over time. For example, the predetermined separation amount may be adjusted based on device motion (e.g., an amount of device that may be measured for a predetermined period of time prior to calculating the switching thresholds). In this way, the switching behavior may be configured to have more hysteresis in instances where there is more device motion (e.g., via hand shake) compared to instances with less device motion (e.g., when the device is positioned on a tripod).

It should be appreciated that the camera selection logic may be configured to, under different circumstances, select and perform different methods of selecting a primary camera from the cameras of the multi-camera system. For example, a camera selection logic may be configured to select a first method under some circumstances that uses object distance estimates from multiple cameras of the multi-camera system as inputs (such as discussed above with respect to FIG. 4). If one of the cameras is unable to provide a corresponding object distance estimate, such as when a position sensor of that camera may not be operating as intended (e.g., when experiencing a certain amount external magnetic interference), the camera selection logic may be configured to select a second method that does not require an object distance estimate from that camera.

Returning to FIG. 4, when a camera other than the second camera 106 is the primary camera, the second camera 106 may optionally be locked to a predetermined focus position. This may be desirable in instances where the target object is at or below the minimum object distance 122 of the second camera 106, such that the second camera 106 may be maintained at a focus position near the macro focus position, which may allow the second camera 106 to be in a preferred position as the target object moves beyond the minimum object distance 122 of the second camera 106 and the camera selection logic 300 again selects the second camera 106 as the primary camera. In these instances, the second camera 106 may prevented from moving away from the predetermined focus position in instances where, for example, the autofocus capabilities of the second camera 106 erroneously calculate that the focus position of the second camera 106 be moved away from the macro focus position, even though the target object remains below the minimum object distance 122 for the second camera 106.

While shown as step 418 in FIG. 4 as occurring after step 406, it should be appreciated that this locking may occur at any time after a different camera (e.g., the first camera 104) is selected as the primary camera (for example, immediately after step 412). When the second camera 106 is locked to a predetermined focus position, this predetermined focus position is preferably the macro focus position for the second camera 106 (i.e., the focus position associated with the minimum object distance for the second camera), although other predetermined focus positions may be used. The second camera may be automatically locked to the predetermined focus position when the second camera 106 ceases to be the primary camera (e.g., when the first camera 104 is selected as the primary camera) or may only be locked if one or more locking criteria are met in addition to the second camera 106 ceasing to be the primary camera. For example, in some variations, the one or more locking criteria may be satisfied (and the second camera 106 may be locked to the predetermined focus position) when an object distance estimate 314 from the depth sensor 110 is below a threshold locking distance. In some of these variations, the second camera 106 may not be released from the predetermined focus position until the second camera 106 is again selected as the primary camera (and thus the focus position may be adjusted to focus on the target object) and/or one or more release criteria have been met. For example, the second camera 106 may be released from the predetermined focus position (even while not the primary camera) if a depth object estimate 314 from the depth sensor 110 is above a threshold unlocking distance. In some instances, there may a predetermined separation between the threshold locking distance and the threshold unlocking distance, which may add some hysteresis to the locking behavior for the second camera.

When the camera selection logic 300 selects a new camera as a primary camera, it should be appreciated that in some instances there may not be instantaneous switchover between primary cameras. Specifically, either of step 412 or 424 (or both step 412 and step 424) of method 400 discussed above may comprise a transition sub-step that transitions from the current primary camera to the newly selected primary camera. This may comprises maintaining the current primary camera as the primary camera until the newly selected primary camera meets one or more transition criteria (at which point the primary camera is switched to the newly selected primary camera). In some variations, the primary camera will be directed to focus on the target object during the transition step, and the transition criteria may comprises determining whether the newly selected primary camera has focused on the target object (or is more closely focused on the target object than the current primary camera).

Using step 412 as an example, it may be possible that at the moment the camera selection logic 300 determines that the first camera 104 should be the primary camera, the first camera 104 may not already be focused on (or even near) the target object. If the camera selection logic 300 were to instantly switch to the first camera 104 as the primary camera, the target object in the live preview may become blurrier than if the live preview were to continue showing image frames from the second camera 106, which may be an undesirable user experience. To address this, the selection logic 300 may initiate a transition step in which the second camera 106 is maintained as the primary camera until the first camera 104 meets a transition criterion, at which point the primary camera is switched to the first camera 104. In some variations, this transition criterion may be whether the first camera 104 has achieved a focus position corresponding to the current focus position of the second camera 106 (with the intent that the target object will be at least as in focus in images from the first camera 104 as they would be in images captured by the second camera 106). In other variations, the transition criterion may be whether the first camera 104 has achieved a focus position corresponding to the target object (i.e., whether the first camera 104 is focused on the target object).

It should be appreciated that during this transition step, the newly selected primary camera may focus on the target object in any suitable manner. In some instances, the newly selected primary camera may focus on the target object using the autofocus capabilities of that camera (e.g., using the autofocus capabilities of the first camera 104 discussed in step 412 above). In other instances, the newly selected primary camera may use one or more of the autofocus assistance techniques discussed below with respect to FIGS. 5 and 6 to focus the newly selected primary camera. Specifically, the using depth-from-defocus to calculate an extrapolated focus position (which may be used with a focus relationship module), as discussed in more detail below, may have particular utility at short subject distances where other autofocus techniques may not be available. For example, in some instances these autofocus assistance techniques may be used to set the focus position of the newly selected camera, or may be used to prompt the camera to perform a partial scan, where the parameters of the partial scan are based at least in part from the autofocus assistance techniques (as discussed in more detail below).

It should also be appreciated that during the transition step, the current primary camera may be locked to a predetermined focus position. For example, when transitioning from the second camera 106 to the first camera 104 as primary camera, the second camera 106 may be locked to a predetermined focus position (which may preferably be the macro focus position for the second camera 106) until the first camera 104 meets the transition criteria discussed above. When the transition step has completed (and the second camera 106 is no longer the primary camera), the second camera 106 may be released or may second camera 106 may be locked to a predetermined focus position as discussed above with respect to step 418. The predetermined focus position to which the second camera 106 is locked during the transition step may the same as or different from the predetermined focus position to which the second camera 106 is locked after the first camera 104 becomes the primary camera.

Focus Relationship Autofocus

Also described here are techniques for calculating an object distance estimate to a target object using a camera of a multi-camera system in instances where the target object is positioned closer than the minimum object distance for the camera. The distance object estimate may be calculated by measuring defocus information associated with the target object while the camera is held at a predetermined focus position. In some instances, this distance object estimate may be used as an input to a camera selection logic for selecting a primary camera of the multi-camera system, as described in more detail above. Additionally or alternatively, the distance object estimate may be used to determine an extrapolated focus position (such as mentioned above), which in turn may be used to help set a focus position of a different camera of the multi-camera system.

For example, when capturing images with a primary camera (e.g., to generate a live preview and/or capture media as discussed above), the autofocus capabilities of the primary camera may have limited applicability in certain circumstances. For example, contrast based autofocus techniques typically require scanning the camera through a range of focus positions, which may be disruptive to the user experience and may be relatively slow when compared to other autofocus techniques like PDAF. PDAF, on the other hand, may encounter difficulties in low light conditions or when the target object has flat textures (which may make it more difficult to measure the phase difference between different asymmetric pixels. Accordingly, it may be desirable in these instances to obtain additional information that may assist in setting a focus position for the primary camera.

For example, in some instances depth information from a depth sensor (e.g., depth sensor 110 of the multi-camera system 102 described above with respect to FIGS. 1A-1D) may be used to provide an object depth estimate for a target object (such as discussed in more detail above), which in turn may be used in setting a focus position for the primary camera. If the primary camera is imaging a target object that is below or near a minimum distance of the operating range of the depth sensor, depth information may be unavailable or not sufficiently reliable to be used in setting the focus position for the primary camera.

In other instances, it may be desirable to use focus position information from a first camera to assist in setting a focus position for a second camera. For example, U.S. Pat. No. 10,429,608, titled "Primary-subordinate camera focus based on lens position sensing," which is hereby incorporated by reference in its entirety, discusses using a first camera to focus on a subject at a first focus position, then selecting a second focus position for a second camera based at least in part the first focus position (such as using a "focus relationship" between the first camera and the second camera). This technique may be beneficial in many instances, but may not be available in instances where the subject is less than the minimum object distance for the first camera (and thus the first camera is unable to focus on the subject. Accordingly, the techniques described here may have particular utility in instances where these other autofocus assistance techniques may not be available.

Figure 5:
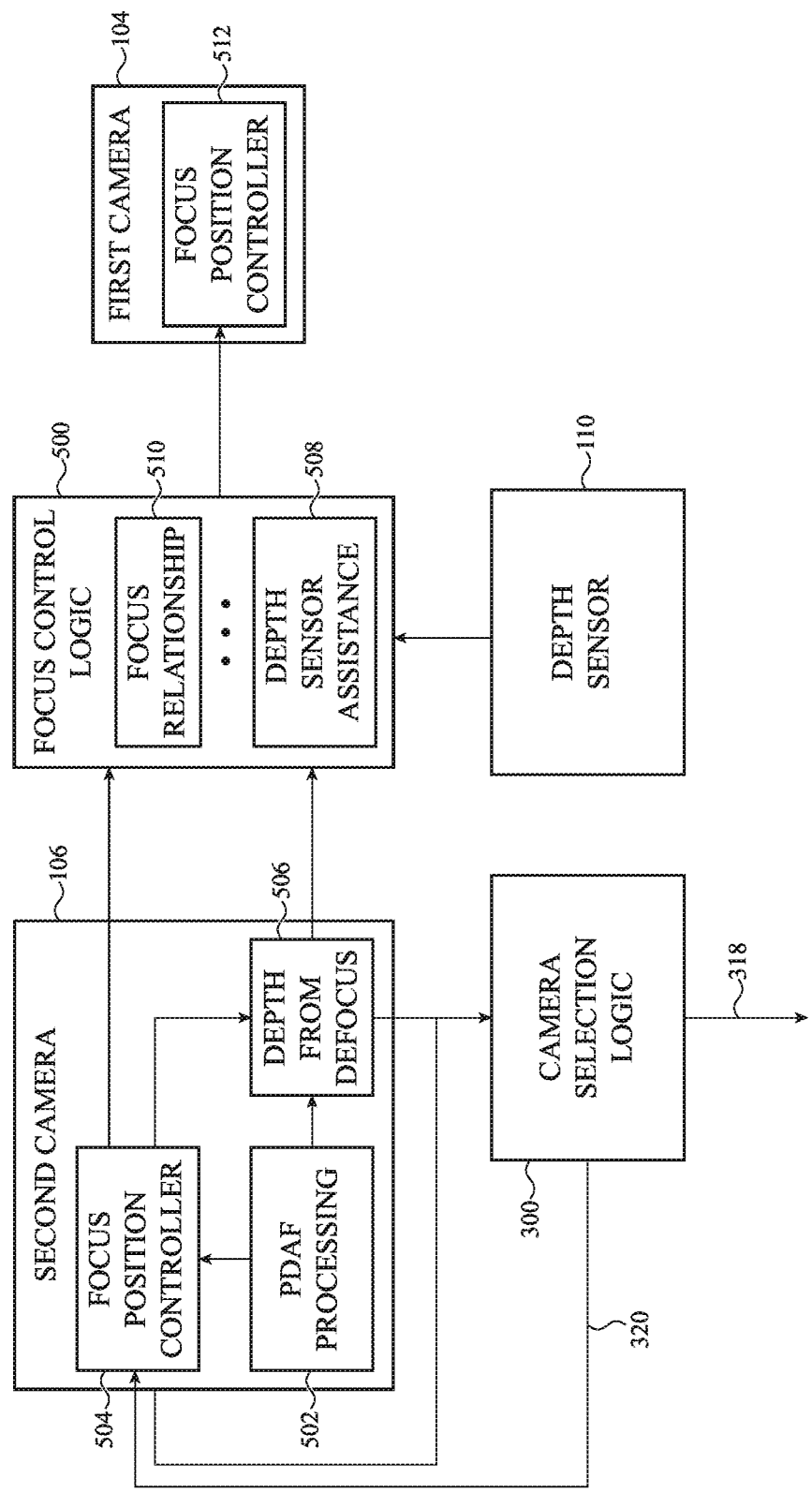
FIG. 5 shows a variation of a focus control logic which may be used to set a focus position of a first camera of a multi-camera system based at least in part on information from a second camera the multi-camera system.

FIG. 5 shows an embodiment of a focus control logic 500 that may cause a first camera to focus on a target object based at least in part using defocus information measured by a second camera. For the purpose of illustration, this focus control logic 500 is discussed here as being used with the first camera 104 and the second camera 106 of the multi-camera system 102. As shown there, the second camera 106 may be configured to perform PDAF and may comprise a PDAF processing module 502 that may be configured to produce focus information associated with a plurality of points in the field of view 122 of the second camera 106. This focus information may comprise a focus value representative of the how focused/defocused incoming light is at a given point in the scene.

In some instances, focus information from the PDAF processing module 502 may be used to set a focus position of the second camera 106 using a focus position controller 504. Specifically, the focus position controller 504 may control the focus position of the second camera 106 (e.g., by controlling an actuator to move an image sensor and/or lens of the second camera 106) and may also measure the current focus position of the second camera 106. The focus position controller 504 may be configured to perform PDAF to adjust the focus position of second camera 106 using focus information from the PDAF processing module 502 in order to focus the second camera 106 on a target object.

It should be appreciated that the focus position controller 504 may provide a measured focus position (or an object distance derived therefrom) as an input to a camera selection logic, which, for example, may be the second object distance estimate 304 received by the camera selection logic 300 described above with respect to FIG. 3 (and which is reproduced in part in FIG. 5) and used to select a primary camera (at output 318). The camera selection logic 300 may, in turn, provide (at output 320) a target focus position to the focus position controller 504, which may set the second camera to the target focus position. This may be done, for example, when the camera selection logic is configured to lock the second camera to a predetermined focus position as discussed above with respect to FIG. 4.

The second camera 106 may further comprise a depth-from-defocus module 506, which receives focus information from the PDAF processing module 502 and a current focus position from the focus position controller 504, and may generate distance information, such as a depth map, based on the amount of defocus in the focus information received from the PDAF processing module. Specifically, for each focus position of the second camera 106, there may a predetermined relationship between defocus and scene distance. This predetermined relationship, which may be experimentally determined during device calibration, may be used to convert defocus information for a point in the scene into a distance for that point in the scene.

In some instances, the depth-from-defocus module 506 may be used to generate distance information associated with a target object, which may be provided to the camera selection logic 300 as an object distance estimate 304 from the second camera 106, which may be used by the camera selection logic in selecting a primary camera. Similarly, the depth-from-defocus module 506 may be configured to output distance error information associated with the depth information (such as discussed in detail above with respect to FIG. 3) generated by the depth-from-defocus module 506. This distance error information may be the depth error information 308 associated with the object distance estimate 304 from second camera 106 that is received by camera selection logic 300 as an input (not shown in FIG. 5).

In other instances, the depth-from-defocus module 506 may output distance information to the focus control logic 500. As shown there, the focus control logic 500 may comprise a plurality of modules that may assist in focusing one or more cameras of the multi-camera system. For example, in the variation of focus control logic 500 as shown in FIG. 5, the focus control logic 500 may provide a target focus position and/or one or more focusing instructions to a focus position controller 512 of the first camera 104. Two modules (a depth sensor assistance module 508 and a focus relationship module 510) are shown in FIG. 5, but it should be appreciated that the focus control logic 500 may include more or fewer modules. The focus control logic 500 may utilize different modules under different circumstances, and may prioritize or combine outputs of the various modules in providing a target focus position and/or one or more focusing instructions to a focus position controller 512 of the first camera 104. Additionally, while the focus control logic 500 is shown in FIG. 5 as only assisting focusing the first camera 104, it should be appreciated that focus control logic 500 (or different focus control logics) may be used to assist in focusing other cameras of the multi-camera system 102.

In variations where the focus control logic 500 includes a depth sensor assistance module 508, the depth sensor assistance module 508 may receive distance information from depth sensor 110 (e.g., an object distance estimate to a target object), and the depth sensor assistance module 508 may select a target focus position for the first camera 104 that corresponds to the distance information received from the depth sensor 110.

In variations where the focus control logic 500 includes a focus relationship module 510, the second camera 106 may focus on a target object (e.g., using an autofocus technique as described above in more detail) and measure the focus position using the focus position controller 504 when the target object is in focus. This measured focus position of the second camera 106 may be provided to the focus relationship module 510, which may select a target focus position for the first camera 104 to focus the first camera 104 on the target object. The focus relationship module 510 may use a predetermined relationship that maps focus positions of the second camera to respective target focus positions on the first camera (such as the focus relationship discussed in U.S. Pat. No. 10,429,608, which was previously incorporated by reference in its entirety).

As mentioned above, when a target object is less than a minimum object distance 122 of the second camera 106, the second camera 106 will be unable to focus on the target object and thus any focus position measured by focus position controller 504 would not be accurate to generate a target focus position for the first camera 104 using the focus relationship module 510. To address this, the distance information for the target object that is generated by the depth-from-defocus module 506 (which, as discussed above, is generated from the focus information from the PDAF processing module 502 and a measured focus position from the focus position controller 504) may be used to generate an extrapolated focus position (which, as discussed above, represents a hypothetical focus position at which the camera would be able to focus on the target object). This extrapolated focus position (which may be beyond the macro focus position and thus may not be a focus position achievable by the second camera 106) may then be used by the focus relationship module 510 in place of the measured focus position from focus position controller 504 to generate a target focus position for the first camera 104. The focus relationship module 510 may also receive distance accuracy information from the depth-from-defocus module 506, which may impact how the focus relationship module 510 assists in focusing the first camera, as will be described below with respect to FIG. 6.

Figure 6:
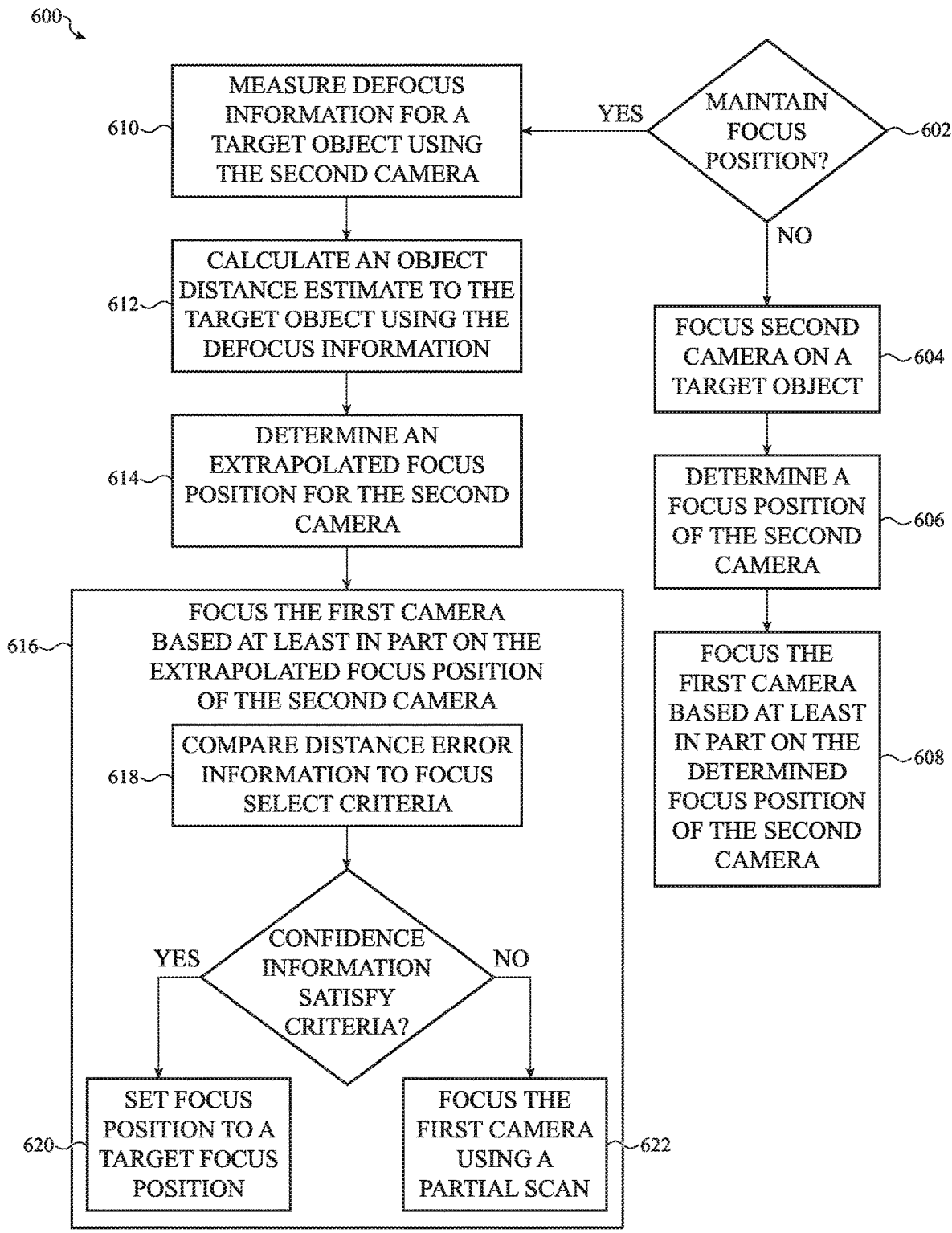
FIG. 6 shows a flowchart the represents an embodiment of a method of calculating distance to a target object using defocus information, and focusing a first camera on a target object based at least in part on information from a second camera.

FIG. 6 shows a flowchart the represents an embodiment of a method 600 of calculating an object distance estimate to a target object using defocus information from a camera of a multi-camera system. The method 600 may further use the object distance estimate from the camera to assist in focusing another camera of the multi-camera system. For the purpose of illustration, the method 600 will be described in the context of the first camera 104 and the second camera 106 of the multi-camera system 102 discussed above with respect to FIGS. 1A-1D.

The method 600 may initially determine whether a focus position of the second camera 106 is being maintained at a predetermined focus position at step 602. In some instances, this may comprise determining that the second camera 106 has been locked to the focus position (i.e., such that the focus position will not change as a function of changes in the scene), such as when camera selection logic 300 locks the focus position of the second camera 106 when the second camera 106 is not the primary camera (as discussed in more detail above). In other instances, the predetermined focus position is a macro focus distance for the second camera 106 and determining whether the second camera 106 is being maintained at a predetermined focus position comprises determining whether a target object is closer than the minimum object distance 122 of the second camera 106. For example, an autofocus operation of the second camera 106 may set the second camera 106 the macro focus position in trying to focus on a target object closer than the minimum object distance 122 of the second camera 106, and the second camera 106 may stay at the macro focus position while the target object is closer than the minimum object distance 122 of the second camera 106.

If the second camera 106 is not maintained at the predetermined focus position, the second camera 106 may focus on the target object using an autofocus technique at step 604. When the second camera 106 is focused on the target object, a focus position of the second camera 106 may be determined at step 606. This focus position may be used to assist in focusing the first camera 104, such as in step 608, where the first camera is focused at least in part based on the focus position determined at step 606 (e.g., using the focus relationship module 510 of camera focus logic 500 described above with respect to FIG. 5).

Conversely, if the second camera 106 is maintained at the predetermined focus position, the second camera 106 may measure defocus information for a target object (that in some instances may be positioned closer than the minimum object distance 122 of the second camera 106) at step 610. This may be done, for example, using the PDAF processing module 502 discussed above. At step 612, an object distance estimate to the target object may be calculated using the defocus information and the predetermined focus position (e.g., a depth-from-defocus module 506 described above with respect to FIG. 5 may make this calculation)

Additionally, the object distance estimate may be used to calculate an extrapolated focus position for the second camera at step 614, as discussed in more detail above. This extrapolated focus position may be used to assist in focusing the first camera 104, such as in step 616, where the first camera is focused at least in part based on the extrapolated focus position calculated at step 614 (e.g., using the focus relationship module 510 of camera focus logic 500 described above with respect to FIG. 5).

In some variations step 616 may further comprise comparing distance error information associated with the object distance estimate may be compared to one or more focus selection criteria at 618. If the distance error information satisfies the focus selection criteria, the first camera 102 may be set to a target focus position (which in turn may be calculated based on the extrapolated focus position as discussed above) at step 620. If the distance error information does not satisfy the focus selection criteria, the first camera 102 may be configured to perform a partial scan (e.g., a partial CBAF scan) at step 622, wherein the boundaries of the partial scan may be determined based on the extrapolated focus position. In this way, the extrapolated focus position of the second camera may be used to directly set the focus position of the first camera in some instances (such as when there is higher confidence in the accuracy of the object distance estimate), while in other instances the extrapolated focus position may guide the selection of the first camera's focus position (such as when there is lower confidence in the accuracy of the object distance estimate).

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. A device comprising:
 a multi-camera system including:
  a first camera configured with autofocus capabilities and having a first minimum object distance; and
  a second camera configured with autofocus capabilities and having a second minimum object distance; and
 a focus control logic configured to:
 cause the second camera to measure defocus information for a target object at a predetermined focus position, the target object being closer than the second minimum object distance;
 determine an extrapolated focus position using the defocus information; and
 cause the first camera to focus on the target object based at least in part on the extrapolated focus position.

2. The device of claim 1, wherein the predetermined focus position corresponds to the minimum object distance of the second camera.

3. The device of claim 1, wherein the focus control logic causes the first camera to lock to the predetermined focus position when one or more predetermined locking criteria is met.

4. The device of claim 3, wherein the multi-camera system further comprises a depth sensor, and wherein the one or more predetermined criteria comprises an object distance estimate for the target object being less than a threshold locking distance.

5. The device of claim 1, wherein the first minimum object distance is less than the second minimum object distance.

6. The device of claim 1, further comprising a camera selection logic configured to select either the first camera or the second camera as a primary camera, and wherein the focus control logic is further configured cause the second camera to measure the defocus information for the target object at the predetermined focus position when first camera is selected as the primary camera.

7. The device of claim 1, wherein causing the first camera to focus on the target object based at least in part on the extrapolated focus position comprises setting a target focus position for the first camera based on a predetermined relationship between the extrapolated focus position when confidence information associated with the extrapolated focus position meets a first predetermined criteria.

8. A method for focusing a first camera of a multi-camera system using a second camera of the multi-camera system comprising:
    measuring defocus information for a target object using the second camera at a predetermined focus position, the target object being closer than a second minimum object distance of the second camera,
    determining an extrapolated focus position using the defocus information, and
    causing the first camera to focus on the target object based at least in part on the extrapolated focus position.

9. The method of claim 8, wherein the predetermined focus position corresponds to a minimum object distance of the second camera.

10. The method of claim 8, further comprising locking the first camera to the predetermined focus position when one or more predetermined locking criteria is met.

11. The method of claim 10, further comprising calculating an object distance estimate for the target object using a depth sensor of the multi-camera system, and comparing the object distance estimate to a threshold locking distance, wherein the predetermined locking criteria is met when the object distance estimate is less than the threshold locking distance.

12. The method of claim 8 wherein measuring defocus information for the target object using the first camera at the predetermined focus position comprises measuring defocus information while the first camera is selected as a primary camera.

13. The method of claim 8, wherein causing the first camera to focus on the target object based at least in part on the extrapolated focus position comprises setting a target focus position for the first camera based on a predetermined relationship between the extrapolated focus position when confidence information associated with the extrapolated focus position meets a first predetermined criteria.

14. The method of claim 13, wherein causing the first camera to focus on the target object based at least in part on the extrapolated focus position comprises performing a partial scan based on the extrapolated focus position when confidence information associated with the extrapolated focus position does not meet a first predetermined criteria.

15. A method of calculating an object distance estimate to a target object using a multi-camera system comprising a first camera and a second camera comprising:
    determining whether the second camera is being maintained at a predetermined focus position;
    measuring, in response to determining that the second camera is being maintained at the predetermined focus position, defocus information for the target object while the second camera is maintained at the predetermined focus position and the target object is closer than a second minimum object distance of the second camera; and
    calculating the object distance estimate using the defocus information and the predetermined focus position.

16. The method of claim 15, wherein determining whether the second camera is being maintained at the predetermined focus position comprises determining that the second camera is locked to the predetermined focus position.

17. The method of claim 15, wherein the predetermined focus position is a macro focus position for the second camera, and wherein determining whether the second camera is being maintained at a predetermined focus position comprises determining that the target object is closer than a minimum object distance of the second camera.

18. The method of claim 15, further comprising calculating an extrapolated focus position for the second camera using the object distance estimate.

19. The method of claim 18, further comprising focusing the first camera based at least in part on the extrapolated focus position for the second camera.

20. The method of claim 19, wherein focusing the first camera based at least in part on the extrapolated focus position comprises selecting a target focus position for the first camera based on a predefined relationship between focus positions of the second camera and focus positions of the first camera.

* * * * *